US009975161B2

(12) United States Patent
Sato

(10) Patent No.: US 9,975,161 B2
(45) Date of Patent: May 22, 2018

(54) TOOL MOUNTING STOCKER, TOOL STORING DEVICE AND TOOL/HAND STORING DEVICE, AND TOOL REPLACING METHOD BY ROBOT AND CONTROL DEVICE THEREOF

(71) Applicant: AMADA CO., LTD., Kanagawa (JP)

(72) Inventor: Masaaki Sato, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 398 days.

(21) Appl. No.: 14/410,631

(22) PCT Filed: Apr. 10, 2013

(86) PCT No.: PCT/JP2013/060817
§ 371 (c)(1),
(2) Date: Dec. 23, 2014

(87) PCT Pub. No.: WO2014/002569
PCT Pub. Date: Jan. 3, 2014

(65) Prior Publication Data
US 2015/0174633 A1 Jun. 25, 2015

(30) Foreign Application Priority Data
Jun. 25, 2012 (JP) ................. 2012-141589

(51) Int. Cl.
*B21D 5/02* (2006.01)
*B23Q 3/155* (2006.01)
(Continued)

(52) U.S. Cl.
CPC ........... *B21D 5/0254* (2013.01); *B21D 5/004* (2013.01); *B21D 5/0218* (2013.01);
(Continued)

(58) Field of Classification Search
CPC ........ Y10T 483/1729; Y10T 483/1731; B21D 5/0254; B21D 37/145; B30B 15/028
(Continued)

(56) References Cited

U.S. PATENT DOCUMENTS 4,510,789 A * 4/1985 Tomioka ................ B21D 5/002
72/384
4,680,955 A * 7/1987 Sakamoto ................ B21D 5/02
100/918
(Continued)

FOREIGN PATENT DOCUMENTS

DE 2844867 A1 * 4/1980 ............... B21D 5/02
EP 0 308 363 3/1989
(Continued)

OTHER PUBLICATIONS

EPO Machine Translation of JP06234018A—Yamada, Toshiaki, "Automatic Die Changing Device of Press Brake", Aug. 23, 1994.*
(Continued)

*Primary Examiner* — Erica E Cadugan
*Assistant Examiner* — Michael Vitale

(57) ABSTRACT

In a tool storing device handling a tool mounting stocker in which a punch and a die of a press brake are mounted in one stocker with rear surfaces facing each other, each of the stockers is supported on both sides by endless belts having one driving shaft, and the endless belts are circulated so that each of the supported stockers does not protrude to a worker side, whereby a position of a path line of the appropriate one of the stockers can be freely positioned at a position of the path line PL of a tool holder on the press brake side. This enables rapid and easy tool replacement by a bending robot by storing not only the tool made of the punch and the die but also the hand for the robot together.

2 Claims, 24 Drawing Sheets

(51) Int. Cl.
- B23Q 3/157 (2006.01)
- B21D 5/00 (2006.01)
- B21D 37/14 (2006.01)
- B30B 15/02 (2006.01)
- B25J 9/16 (2006.01)

(52) U.S. Cl.
CPC ......... *B21D 5/0227* (2013.01); *B21D 37/145* (2013.01); *B23Q 3/15724* (2016.11); *B25J 9/1679* (2013.01); *B30B 15/028* (2013.01); *Y10S 901/02* (2013.01); *Y10T 483/10* (2015.01); *Y10T 483/1729* (2015.01); *Y10T 483/1731* (2015.01); *Y10T 483/1891* (2015.01)

(58) Field of Classification Search
USPC .......................................... 483/28, 29; 72/446
See application file for complete search history.

(56) References Cited

U.S. PATENT DOCUMENTS

| | | | | |
|---|---|---|---|---|
| 5,134,873 A | * | 8/1992 | Miyagawa | B21D 5/02 483/29 |
| 5,168,745 A | * | 12/1992 | Miyagawa | B21D 5/02 483/29 |
| 6,024,681 A | | 2/2000 | Latten et al. | |
| 6,656,099 B1 | | 12/2003 | Akami et al. | |
| 2003/0064871 A1 | | 4/2003 | Akami et al. | |
| 2003/0069114 A1 | | 4/2003 | Akami et al. | |
| 2003/0092547 A1 | | 5/2003 | Akami et al. | |
| 2004/0157715 A1 | | 8/2004 | Akami et al. | |
| 2007/0271987 A1 | * | 11/2007 | Shimizu | B21D 5/02 72/381 |
| 2009/0139296 A1 | | 6/2009 | McCauley | |

FOREIGN PATENT DOCUMENTS

| | | | | |
|---|---|---|---|---|
| JP | 62-57717 | | 3/1987 | |
| JP | 02220715 A | * | 9/1990 | .......... B21D 5/0254 |
| JP | 6-234018 | | 8/1994 | |
| JP | 7-260089 | | 10/1995 | |
| JP | 8-112620 | | 5/1996 | |
| JP | 10-230399 | | 9/1998 | |
| JP | 11000718 A | * | 1/1999 | |
| JP | 2001-150032 | | 6/2011 | |
| WO | 00/41824 | | 7/2000 | |

OTHER PUBLICATIONS

Partial Supplementary European Search Report for 13810181.1 dated May 18, 2016.
Official Action, along with English-language translation thereof, for JP Appl. No. 2012-141589 dated Aug. 9, 2016.
International Search Report for PCT/JP2013/060817 with English translation dated Jul. 16, 2013.
Official Action, along with English-language translation thereof, for JP Appl. No. 2012-141589 dated Mar. 8, 2016.

* cited by examiner

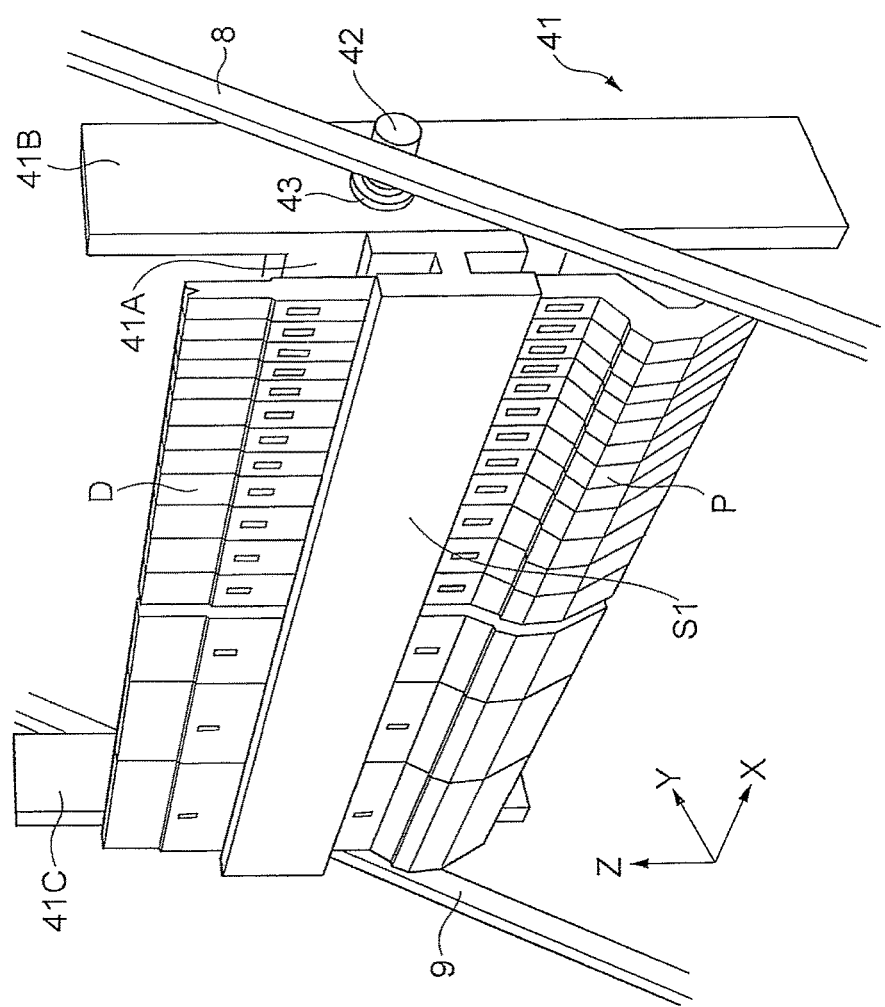

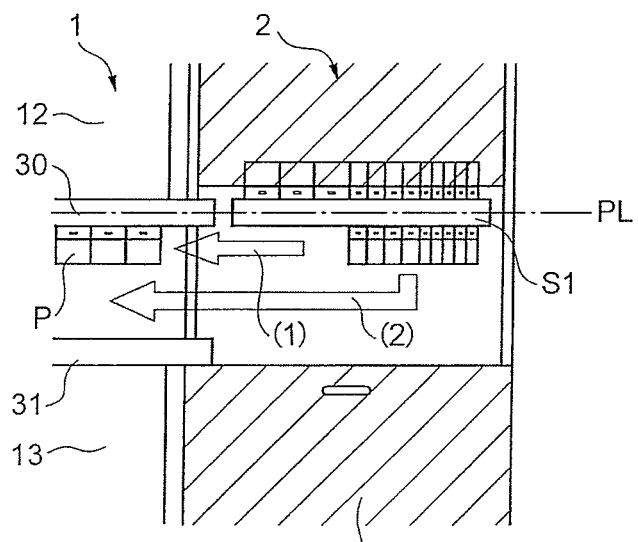
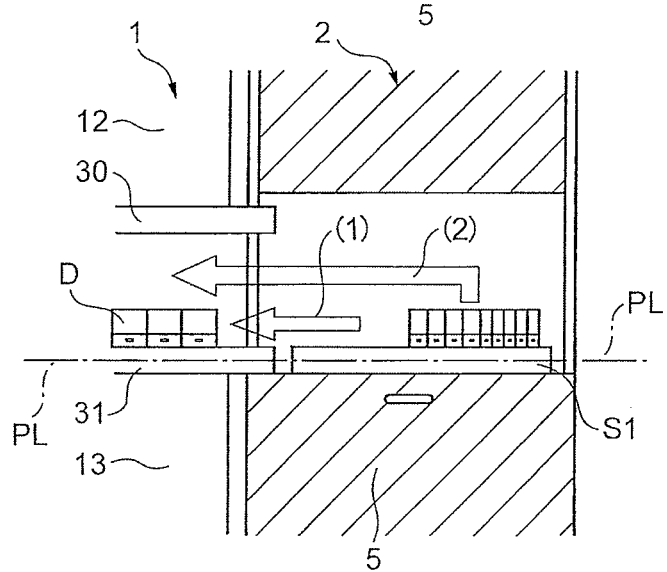

FIG.21

| Bending Order | Tool | Tool Layout | Working Station ST1 | | | | | Working Station ST2 | | | | ... |
|---|---|---|---|---|---|---|---|---|---|---|---|---|
| | | | X1 | X1X2X3 | X2X3X4 | X3X4X5 | | X1 | X1X2X3 | X2X3 | X3X4 | |
| (1) | ... | a | O | | | | | | | | | ... |
| (2) | ... | b | O | O | O | O | O | | | | | ... |
| (3) | ... | c | | | | | | | O | O | | ... |
| (4) | ... | d | | | | | | O | O | O | O | ... |

TOOL MOUNTING STOCKER, TOOL STORING DEVICE AND TOOL/HAND STORING DEVICE, AND TOOL REPLACING METHOD BY ROBOT AND CONTROL DEVICE THEREOF

TECHNICAL FIELD

The present invention relates to a tool mounting stocker in which a punch and a die constituting a tool are mounted in one stocker with rear surfaces facing each other, a tool storing device handling a tool mounting stocker and a tool/hand storing device, and to a tool replacing method by a robot using the tool/hand storing device and a control device directly used for executing the tool replacing method by the robot.

BACKGROUND ART

Conventionally, a press brake provided with a tool storing device has been used as disclosed in Japanese Patent Laid-Open No. 2001-150032, for example.

The above-described tool storing devices are installed on both sides of the press brake.

With this configuration, a punch P and a die D to be used for the subsequent bending work are selected from among the punches P and the dies D stored in one of (left side, for example) tool holding portions 29 (FIG. 1 in the Patent Gazette) and are laid out on a punch holding portion 25 and a die holding portion 27 of a tool rack 5L on the same side during the bending work.

When the bending work is finished, the used punch P and die D are removed from a press brake PB and moved to the other (right side, for example) tool rack 5R and then, the punch P and the die D laid out on the one tool rack 5L are moved to the press brake PB side and attached.

On the other hand, a hand replacing device of a bending robot has been conventionally disclosed in Japanese Patent Laid-Open No. 8-112620, for example.

In this Gazette, a table 9A on which various grippers, that is, hands are mounted is installed lateral to a press brake 1 with a bending robot 3 (FIG. 1 in the Gazette).

With this configuration, after the bending robot 3 is positioned at a position of the table 9A (a broken line in FIG. 1 of the Gazette), a necessary hand is taken out in accordance with a form of a work which is a bending work target and is attached to the bending robot 3 so as to replace the hand.

CITATION LIST

Patent Literature

PTL 1: Japanese Patent Laid-Open No. 2001-150032
PTL 2: Japanese Patent Laid-Open No. 8-112620

SUMMARY OF INVENTION

Technical Problem (1) Problem Relating to a Tool Storing Device
In the prior-art tool storing device (Japanese Patent Laid-Open No. 2001-150032), a punch and a die constituting a tool are stored separately.

Specifically, either the punch or the die, for example, only the punch or only the die, is mounted in a container called a stocker.

Moreover, driving sources of the punch P and the die D are different from each other, and moreover, moving paths of the punch P and the die D are formed separately.

Therefore, the prior-art tool storing device has problems such that a configuration is complicated, an installation space has a useless space, and further tool replacement takes time.

(2) Problems Relating to a Hand Replacing Device of a Bending Robot
In the prior-art hand replacing device of the bending robot (Japanese Patent Laid-Open No. 8-112620 Gazette), the table 9A on which the hand is mounted is provided at a spot away from the tool storing device.

Therefore, if the bending robot 3 is to perform tool replacement after hand replacement, it needs to move to the tool storing device (not disclosed in the Gazette) provided separately form the hand, which is extremely inefficient.

Moreover, judging from the description in the entire Gazette, the gripper, that is, the hand for gripping the work is considered in the Gazette, but the hand for tool replacement is not considered, and tool replacement by the bending robot 3 is difficult.

As a result, in the prior-art hand replacing device of the bending robot, rapid tool replacement by the bending robot is difficult and moreover, achievement of tool replacement itself might become impossible.

The present invention has an object to simplify a configuration of the entire tool storing device and save an installation space by storing the punch and the die together, to reduce time for tool replacement, and to enable rapid and easy tool replacement by the bending robot by storing not only the tool made of the punch and the die but also the hand for the robot together.

In order to solve the above-described problems, the present invention has technical measures such as, tool mounting stockers S1 to S8 (FIGS. 1 to 3) characterized in that the punch P and the die D of a press brake 1 are mounted in one stocker with rear surfaces facing each other;

a tool storing device 2 (FIG. 1) for handling the tool mounting stockers S1 to S8, characterized in that
the tool storing device 2 is installed lateral to the press brake 1, and has, in the one stocker,
a plurality of tool mounting stockers S1 to S8 each mounting the punch P and die D of the press brake 1 with the rear surfaces facing each other;
endless belts 8, 9 having one driving shaft support both sides of each of the stockers S1 to S8 and the endless belts 8, 9 are circulated so that each of the supported stockers S1 to S8 does not protrude to a worker S side, whereby a position of a path line PL of an appropriate one of the stockers S1 to S8 can be freely positioned at a position of a path line PL of a tool holder 30, 31 on a side of the press brake 1;

a tool/hand storing device 3 (FIG. 9) characterized by including the tool mounting stocker for mounting the punch P and die D of the press brake 1 and a hand mounting stocker for mounting hands 57, 58 used by a bending robot 4;

a tool replacing method by a robot (FIG. 17 and FIGS. 18(A) to 18(D)) using the tool/hand storing device 3, characterized by including the steps of:
(1) positioning the hand mounting stocker S2, S5 at a hand replacement position HCP;
(2) thereafter replacing a hand of the bending robot 4 from a work gripping hand to a tool replacing hand; then
(3) positioning a position of a path line PL of an appropriate stocker of the tool mounting stockers S1, S3 to S4, and S6 and S8 at a position of a path line of the tool holder 30, 31 on a side of the press brake 1; and (4) thereafter replacing the tool between the appropriate stocker and the tool holder 30, 31 on the side of the press brake 1 through the above-described tool replacing hand 58, by moving the bending robot 4;

a control device 20 (FIG. 19) directly used for performing the tool replacing method by the robot described above, characterized by including:

tool layout determining unit 20D configured to determine a bending order of a work W, a tool to be used, and a tool layout on the basis of product information;

a tool/hand mounting information determining unit 20E configured to determine tool/hand mounting information (FIG. 22) regarding on what position of which stocker a tool constituting the determined tool layout is mounted; and on what position of which stocker a hand that should be provided in the bending robot 4 when the work is to be gripped and when the tool is to be replaced is mounted;

a tool/hand storing device control unit 20F configured to determine the hand 57, 58 and the tool that the bending robot 4 should require on the basis of the tool layout and tool/hand mounting information determined as above, for positioning the appropriate stocker of the hand mounting stockers S2 and S5 or the stocker in which the work gripping hand 57 and the tool replacing hand 58 are mixed at a hand replacement position, or for positioning the position of the path line PL of the appropriate stocker of the tool mounting stockers S1, S3 to S4, and S6 to S8 to the position of the path line PL of the tool holder 30, 31 on the side of the press brake 1;

a hand replacement control unit 20G configured to make hand replacement performed between the appropriate stocker of the hand mounting stockers and the stocker in which the work gripping hand and the tool replacing hand are mixed and the above-described bending robot through the bending robot; and a tool replacement control unit 20H configured to make tool replacement performed between the appropriate stocker of the tool mounting stockers S1, S3 to S4, and S6 to S8 and the tool holder 30, 31 on the side of the press brake 1 through the bending robot 4.

According to the above-described configuration of the present invention, by using the tool mounting stockers S1 to S8 in which the punch P and the die D of the press brake 1 are mounted in one stocker (FIGS. 3(A) to 3(C)) with rear surfaces facing each other, the punch P and the die D can be stored together in the same tool storing device 2 (FIG. 1), the endless belts 8, 9 having the one driving shaft (FIG. 5) circulate so that the stockers S1 to S8 supported on the both sides do not protrude to the worker S side (FIG. 2), and the position of the appropriate stocker can be positioned at the position on the tool holder 30, 31 side of the adjacent press brake 1 (FIGS. 6(A) and 6(B)) and thus, tool replacement becomes possible immediately (FIGS. 7(A) and 7(B)) and therefore, by storing the punch and the die together, the configuration of the entire tool storing device can be simplified and the installation space can be saved, and tool replacement time can be reduced; and according to the above-described configuration of the present invention, in the same tool/hand storing device 3 (FIG. 9), not only the punch P and the die D but also the hand for the robot can be stored together, the endless belts 8, 9 similarly having the one driving shaft (FIG. 5) circulate so that the stockers S1 to S8 supported on the both sides do not protrude to the bending robot 4 side this time (FIG. 10), the position of the appropriate stocker in the tool mounting stockers S1, S3 to S4, and S6 to S8 can be positioned at the position on the tool holder 30, 31 side of the adjacent press brake 1 (FIGS. 6(A) and 6(B)) and at the same time, the appropriate stocker of the hand mounting stockers S2 and S5 or the hand mounting stocker in which the work gripping hand 57 and the tool replacing hand 58 are mixed can be freely positioned at the hand replacement position HCP (FIGS. 18(A) to 18(D)) and thus, tool replacement by the bending robot 4 can be realized easily (FIGS. 14(A) to 16(B)) and therefore, by storing not only the tool composed of the punch and the die but also the hand for robot together, tool replacement by the bending robot can be realized rapidly and easily.

Advantageous Effects of Invention

As described above, according to the present invention, there is an effect to simplify a configuration of the entire tool storing device and save an installation space by storing the punch and the die together, to reduce time for tool replacement, and to enable rapid and easy tool replacement by the bending robot by storing not only the tool made of the punch and the die but also the hand for the robot together.

BRIEF DESCRIPTION OF DRAWINGS

FIG. 4 is a view illustrating a relationship between the tool mounting stocker constituting the present invention and endless belts 8, 9.

FIGS. 7(A) and 7(B) are views illustrating a movement state of a tool from a side of the tool storing device 2 to the side of the press brake 1 when tool replacement according to the present invention is performed.

FIGS. 18(A) to 18(D) are explanatory views of Step 102 to Step 105 in

FIG. 17.

FIG. 21 is a view illustrating a result of FIG. 20.

DESCRIPTION OF EMBODIMENTS

Figure 1:
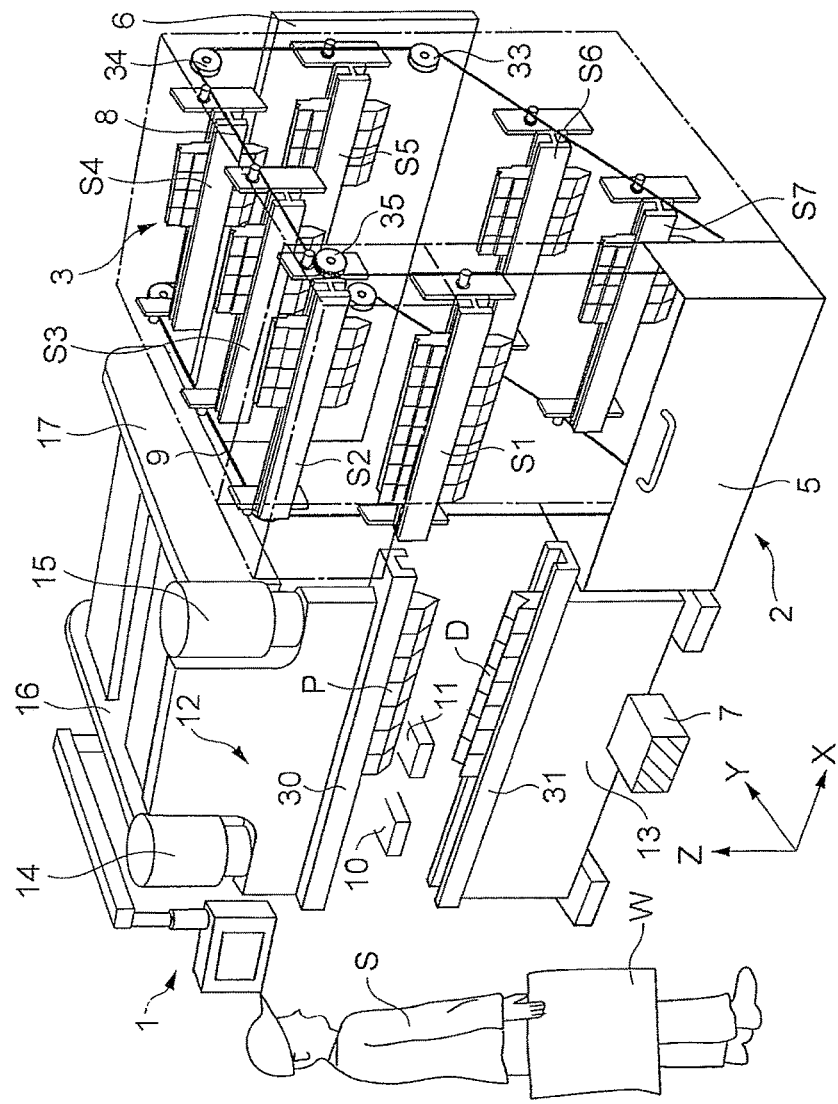
FIG. 1 is a perspective view illustrating a tool storing device 2 according to the present invention.

The present invention will be explained below using embodiments by referring to the attached drawings. FIG. 1 is a perspective view illustrating a tool storing device 2 of the present invention.

A press brake 1 illustrated in FIG. 1 has side plates 16 and 17 on both sides of a machine body, on upper parts of the side plates 16 and 17, an upper table 12 is mounted through hydraulic cylinders 14 and 15, for example, which are ram driving sources, and to the upper table 12, a punch P which is one of tools (in more detail, a split tool) is attached through a punch holder 30.

Moreover, on lower parts of the side plates 16 and 17, a lower table 13 is arranged, and to the lower table 13, a die D which is the other tool (in more detail, a split tool) is attached through a die holder 31.

With this configuration, a worker S makes a work W abut against stoppers 10 and 11 of a back gauge arranged in a rear of the lower table 13 and positions the work W, and then, when the worker S steps on a foot pedal 7, for example, so as to operate the hydraulic cylinders 14 and 15 and to lower the upper table 12 which is a ram, the work W is subjected to bending work by collaboration of the punch P and the die D which are the pair of tools.

Figure 9:
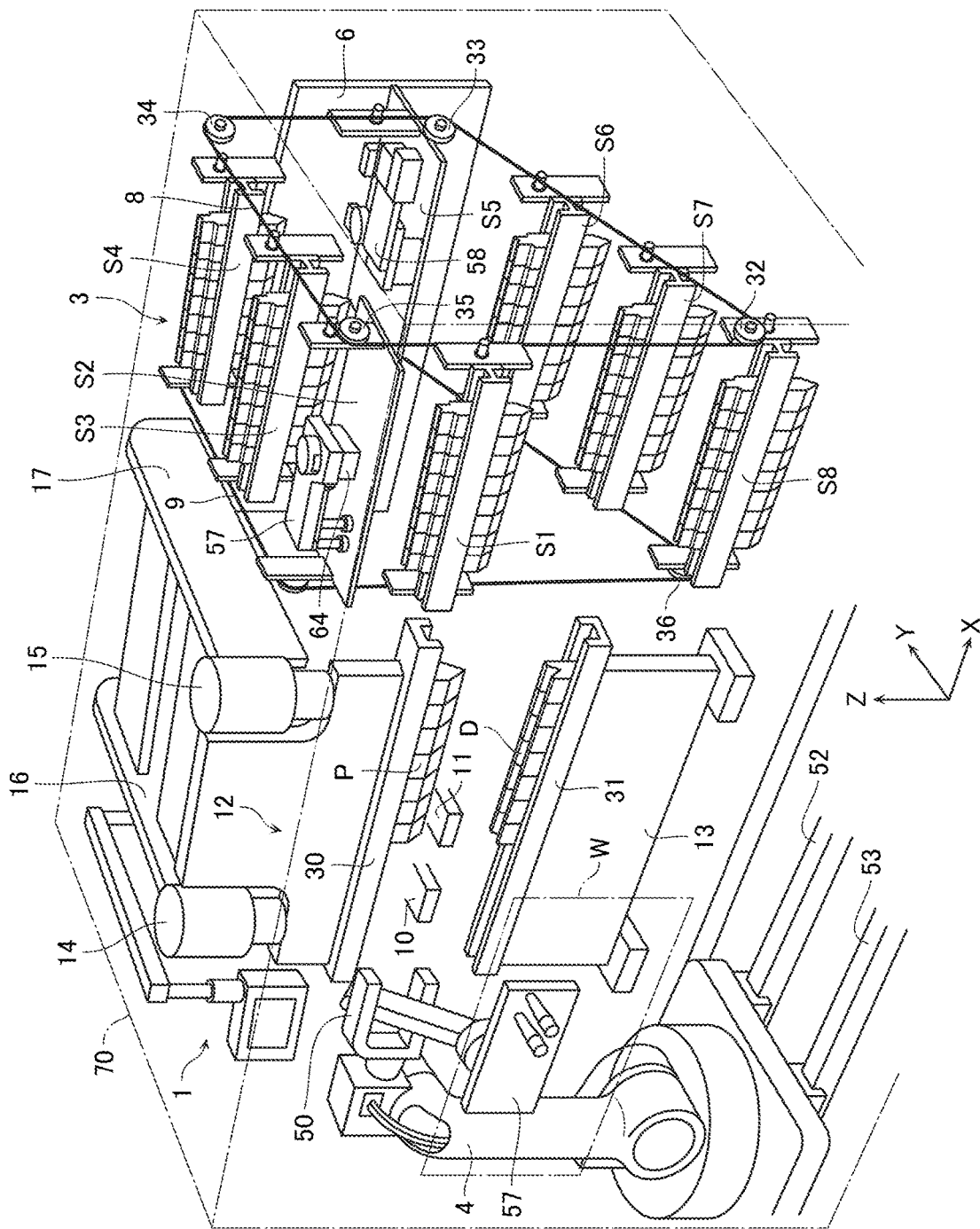
FIG. 9 is a perspective view illustrating a tool/hand storing device 3 according to the present invention.
Figure 11:
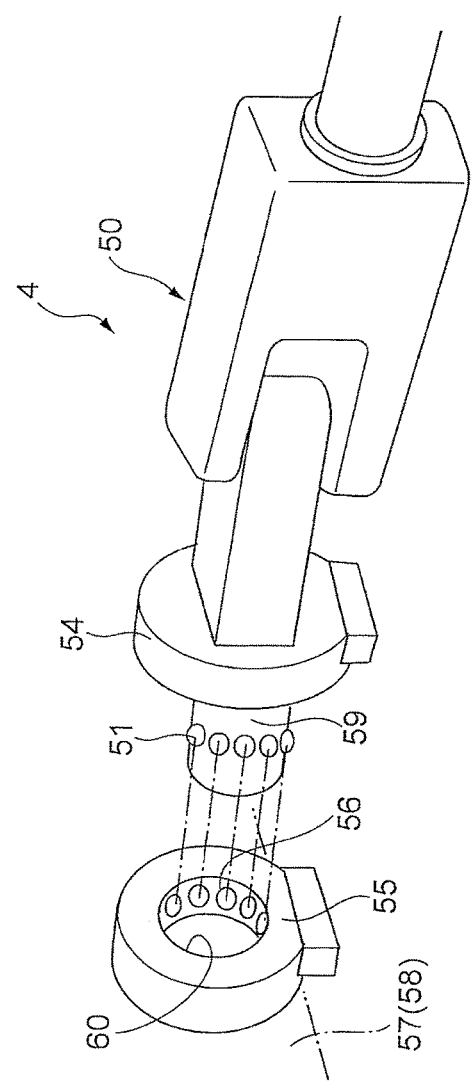
FIG. 11 is a view illustrating an attaching/detaching mechanism between a bending robot 4 and a work gripping hand 57 or a tool replacing hand 58 constituting the present invention.

That is, the press brake 1 illustrated in FIG. 1 is a lowering type press brake in which the work W is subjected to bending work by lowering of the upper table 12 which is a ram, and the press brake illustrated in FIGS. 9 and 11 are similar to that but the present invention is not limited to them and it may be a rising type press brake in which the work W is subjected to bending work by rising of the lower table 13 which is a ram.

Both the above-described punch holder 30 and die holder 31 slightly protrude to the tool storing device 2 side which will be described later, whereby tool replacement (FIGS. 7(A) and 7(B)) is smoothly performed between the press brake 1 and the tool storing device 2.

As illustrated in FIG. 1, the tool storing device 2 is installed lateral to the above-described press brake 1.

Figure 3A:
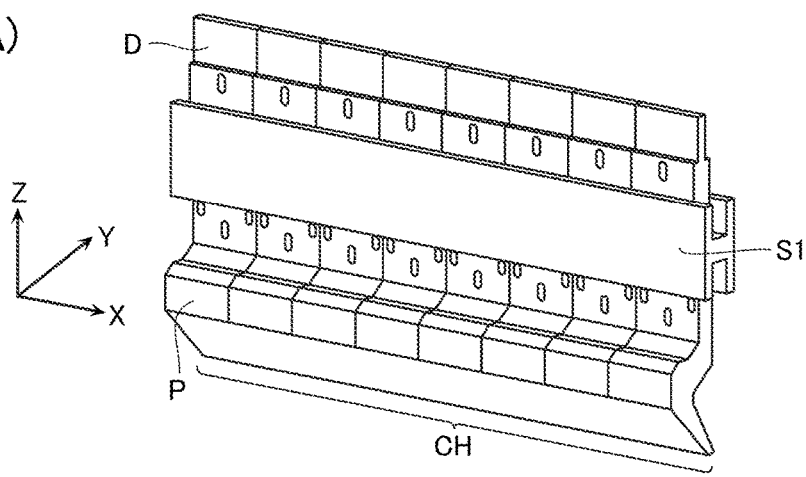
FIGS. 3(A) to 3(C) are views illustrating a tool mounting stocker constituting the present invention.
Figure 3B:
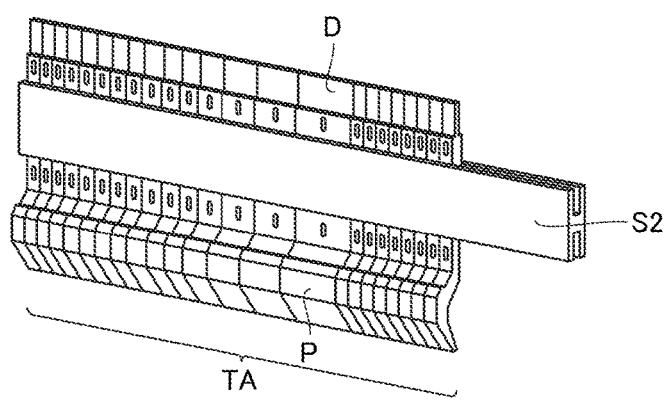
Figure 3C:
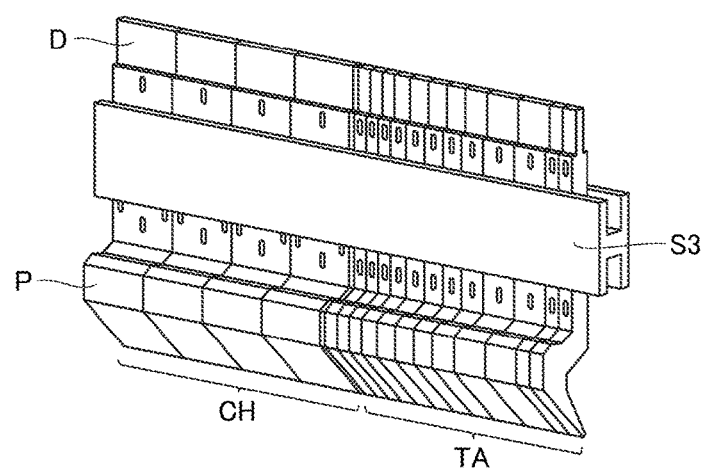

In this case, the tool storing device 2 has a plurality of tool mounting stockers S1 to S8 in which the punch P and the die D of the press brake 1 are mounted with the rear surfaces facing each other (FIGS. 3(A) to 3(C), for example).

For example, as illustrated in FIG. 3(A), only a lengthy tool CH (having a length (X-axis direction) of 100 mm, for example) is mounted in the tool mounting stocker S1, as illustrated in FIG. 3(B), a short tool TA (having a length (X-axis direction) of 15 mm, 20 mm, 25 mm, 30 mm, 50 mm, 60 mm, and 80 mm, for example) is mounted in the tool mounting stocker S2, and as illustrated in FIG. 3(C), the above-described lengthy tool CH and the short tool TA are mixed and mounted at respective predetermined positions (X-coordinates) in the tool mounting stocker S3.

Therefore, as compared with a prior-art example in which only one type of a tool or the punch P or the die D, for example, can be mounted in one stocker and at least two stockers are required for mounting the punch P and the die D, according to the present invention, as described above, the punch P and the die D can be mounted in one stocker with the rear surfaces facing each other, and only one stocker is sufficient for mounting the punch P and the die D, and thus, the number of stockers can be reduced.

The above-described tool made of the punch P and the die D, the stockers S1 to S8 for mounting the tolls P and D, and the tool holders 30 and 31 on the press brake 1 side are all modular types, have the same structure and the details are disclosed in WO00/41824 Gazette.

Figure 2:
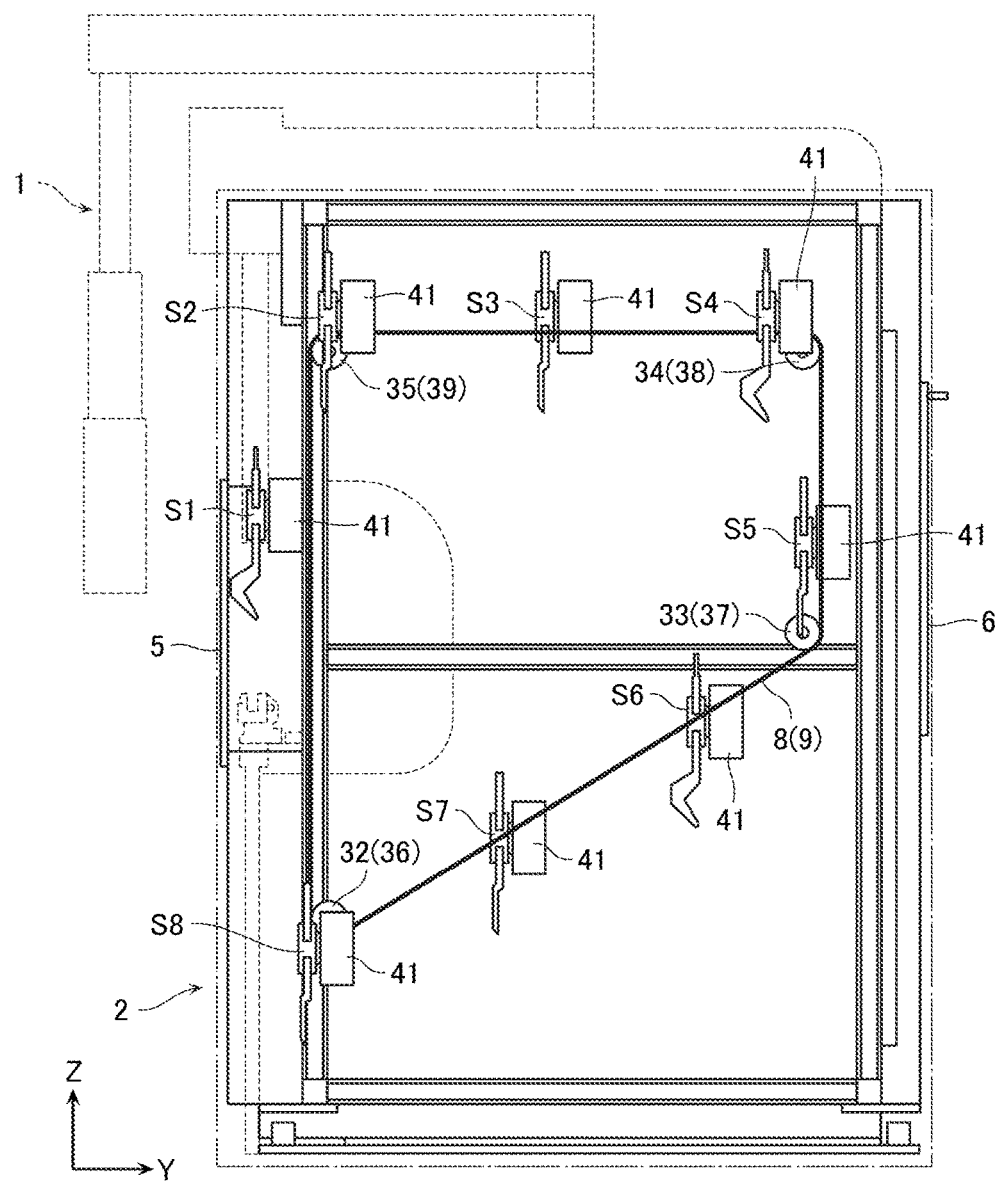
FIG. 2 is a side view of FIG. 1.

The above-described tool mounting stockers S1 to S8 are mounted in the above-described tool storing device 2 (FIGS. 1 to 2) by the following configuration.

That is, as illustrated in FIG. 4, the tool mounting stocker S1, for example, is fixed to a front (the worker S (FIG. 1) side) of a support base 41, while the both sides of the support base 41 (X-axis direction) are supported by the endless belts 8, 9 (FIG. 1).

The support base 41 has a substantially U-shape when seen from a vertical direction (Z-axis direction) and is constituted by a member 41A extending in a lateral direction (X-axis direction) and members 41B and 41C on both ends of and orthogonal to the member 41A.

The above-described tool mounting stocker S1 is fixed to the lateral direction member 41A, a support shaft 42 is rotatably supported by the orthogonal members 41B and 41C through a bearing 43, and the support shaft 42 is fixed to outer sides of the endless belts 8, 9 (lower sides in FIG. 4).

With this configuration, even if the endless belts 8 (FIG. 2) and 9 are circulated through pulleys 32 to 35 and 36 to 39 which will be described later and their direction is changed, that is, even if they are directed to a horizontal direction, a vertical direction or a diagonal direction, for example, the above-described support base 41 and the stockers S1 to S8 in which the punch P and the die D are mounted are configured to be directed downward at all times by an action of a force of gravity.

Therefore, the position of the path line PL of the appropriate stocker S1 to S8 of the tool mounting stockers S1 to S8 is positioned at the position of the path line PL of the tool holder 30, 31 on the press brake 1 side (FIGS. 6(A) to 7(B)), whereby tool replacement is made possible.

Figure 5:
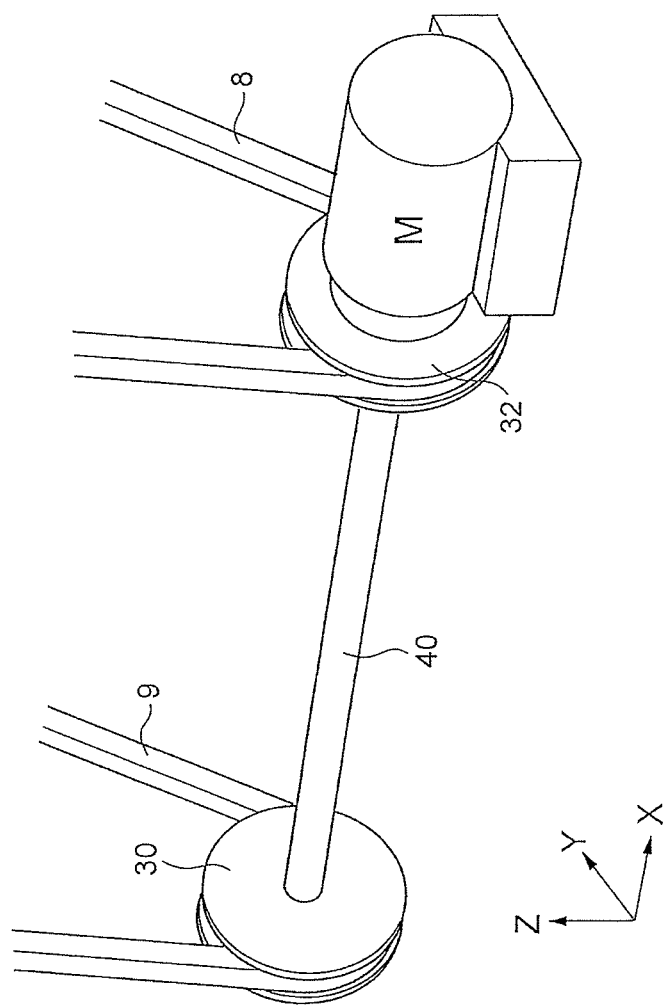
FIG. 5 is a view illustrating driving pulleys 32 and 36 constituting the present invention.

On the other hand, as described above, the endless belts 8 (FIGS. 1 to 2) and 9 supporting the both ends of the tool mounting stockers S1 to S8 circulate through the pulleys 32 to 35 and 36 to 39, but the driving shaft in this case is one shaft (FIG. 5).

For example, the pulley 32 of the pulleys 32 (FIG. 2) to 35 and 36 to 39 is used as a driving pulley 32 (FIG. 5), and the driving pulley 32 is directly connected to a motor M and is also connected to the facing pulley 36 by a connecting shaft 40.

With this configuration, by operating the motor M, the driving pulley 32 is rotated, and its rotating force is transmitted to the other driven pulleys 33, 34, and 35 through the endless belt 8, while the pulley 36 connected to the connecting shaft 40 serves as a driving pulley and rotates simultaneously with the driving pulley 32 and its rotating force is similarly transmitted to the other driven pulleys 37, 38, and 39 through the endless belt 9.

Figure 6A:
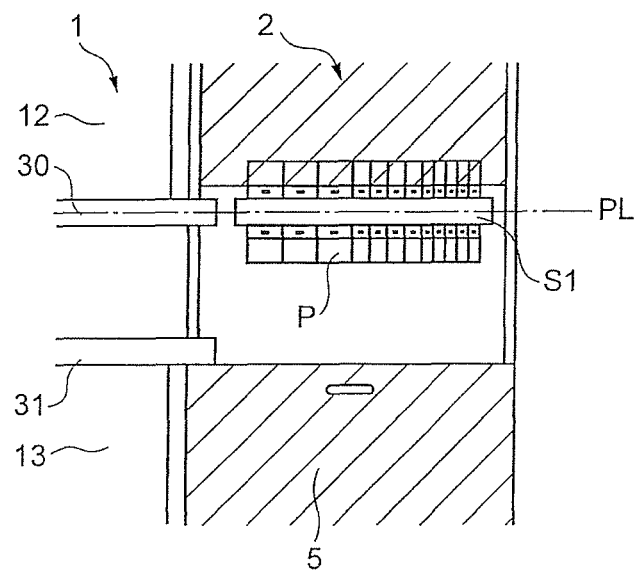
FIGS. 6(A) and 6(B) are views illustrating a relationship between the tool mounting stocker on a side of the tool storing device 2 and tool holder 30, 31 on a side of a press brake 1 before tool replacement according to the present invention.
Figure 6B:
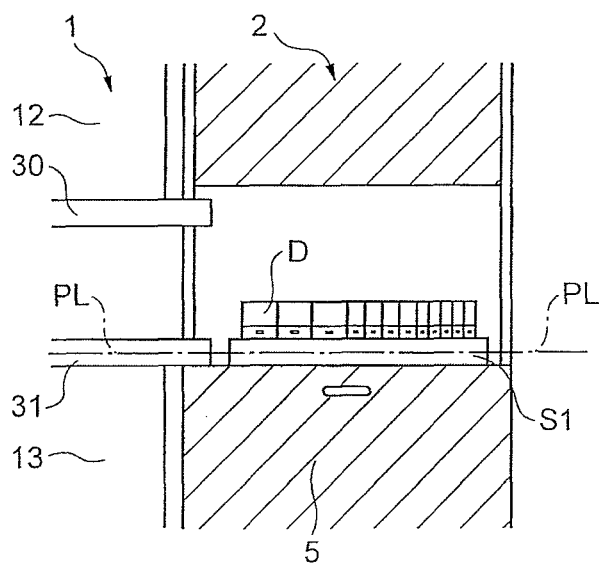

Thus, the endless belts 8, 9 smoothly circulate while supporting the tool mounting stockers S1 to S8 and by positioning the position of the path line PL of the appropriate stocker S1 to S8 of the tool mounting stockers S1 to S8 at the position of the path line PL of the tool holder 30, 31 on the press brake 1 side (FIGS. 6(A) and 6(B)), for example, as described above, tool replacement (FIGS. 7(A) and 7(B)) is made possible.

The above-described path line PL (FIGS. 6(A) to 7(B)) is a movement reference line of the tool P, D, and since the tool mounting stockers S1 to S8 and the tool holder 30, 31 have the same structure as described above, by positioning each path line PL at the same height position, movement of the tool P, D between the tool mounting stockers S1 to S8 and the tool holder 30, 31 is performed extremely smoothly, and tool replacement (FIGS. 7(A) and 7(B)) is made possible as described above.

According to the present invention, the endless belts 8, 9 have one driving shaft and thus, the configuration is simpler than the conventional one and the installation space can be small.

Moreover, according to the present invention, when the endless belts 8 (FIGS. 1 to 2) and 9 circulate, it is configured such that the tool mounting stockers S1 to S8 do not protrude to the worker S side, whereby tool replacement can be easily performed by the worker S.

Use of an endless chain and a sprocket instead of the above-described endless belts 8 (FIGS. 1 to 2) and 9 and the pulleys 32 to 35 and 36 to 39 does not make any problem.

Moreover, shutters 5 and 6 are provided on a front part and a rear part of the above-described tool storing device 2.

That is, the entire tool storing device 2 (FIG. 1) is covered by a case with a transparent frame outer side (one-dot chain line), whereby safety of the worker S is ensured, and the shutters 5 and 6 are provided on the front part and the rear part as described above and are configured to be opened/closed as necessary.

For example, when the position of the path line PL of the appropriate stocker S1 to S8 is to be positioned at the position of the path line PL of the tool holder 30, 31 on the press brake 1 side (FIGS. 6(A) and 6(B)) or at tool replacement (FIGS. 7(A) and 7(B)), by lowering the front shutter 5 to the lowest position, each of the above-described operations can be visually checked by the worker S.

Figure 8:
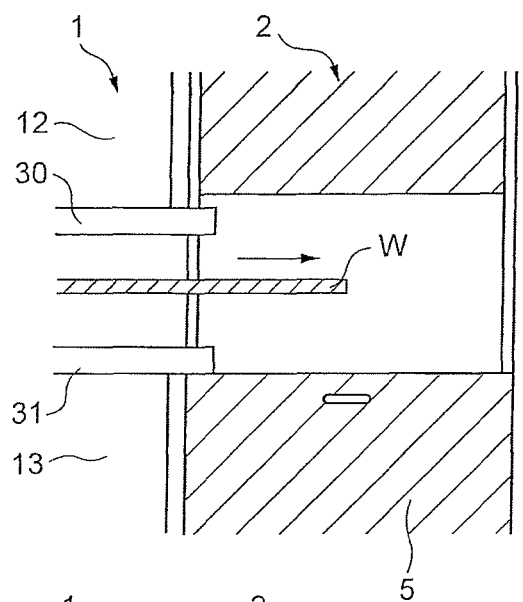
FIGS. 8(A) and 8(B) are views illustrating a role of the tool storing device 2 at bending work (FIG. 8(A)) and at movement of the tool mounting stocker (FIG. 8(B)) according to the present invention.
Figure 8:
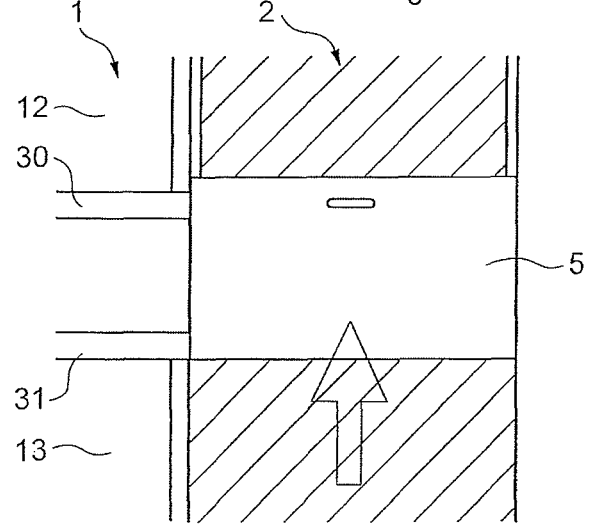

Moreover, the front shutter 5 (FIG. 8(A)) is configured to be lowered to the lowest position during bending work so as to form a region having no stocker in a state in which a front center part is open, and lateral withdrawal of the machined work is made possible.

Moreover, the front shutter 5 (FIG. 8(B)) ensures safety of the worker S by rising from the lowest position during movement of the stocker so as to close the front center part.

On the other hand, by lowering the rear shutter 6 (FIG. 2) to the lowest position, a setup station is formed.

Moreover, in tool replacement (FIGS. 7(A) and 7(B)), in the case of replacement of the punch P (FIG. 7(A)), since the lengthy tool (100 mm, for example) is relatively heavy, the worker S (FIG. 1) laterally moves it to the punch holder 30 side from the tool mounting stocker S1 without taking it out (arrow (1)), while since the short tool (50 mm, for example) is relatively light, the worker takes it out from the tool mounting stocker S1 and arranges it at a predetermined position on the punch holder 30 side (arrow (2)).

This also applies to the case of replacement of the die D (FIG. 7(B)).

FIG. 9 is a perspective view illustrating the tool/hand storing device 3 according to the present invention.

A general difference from the tool storing device 2 illustrated in FIG. 1 is that the tool/hand storing device 3 includes not only the tool mounting stocker but also a hand mounting stocker.

In the following embodiment, the tool/hand storing device 3 (FIGS. 9 to 10) having the tool mounting stocker in which the punch P and the die D of the press brake 1 are mounted with the rear surfaces facing each other will be described in detail.

Moreover, a specific difference between the tool storing device 2 in FIG. 1 and the tool/hand storing device 3 in FIG. 9 will be made clear by first to fourth differences which will be described later.

The tool/hand storing device 3 in FIG. 9 is surrounded by a safety fence 70 (one-dot chain line) together with the adjacent press brake 1 so as to ensure safety.

Figure 17:
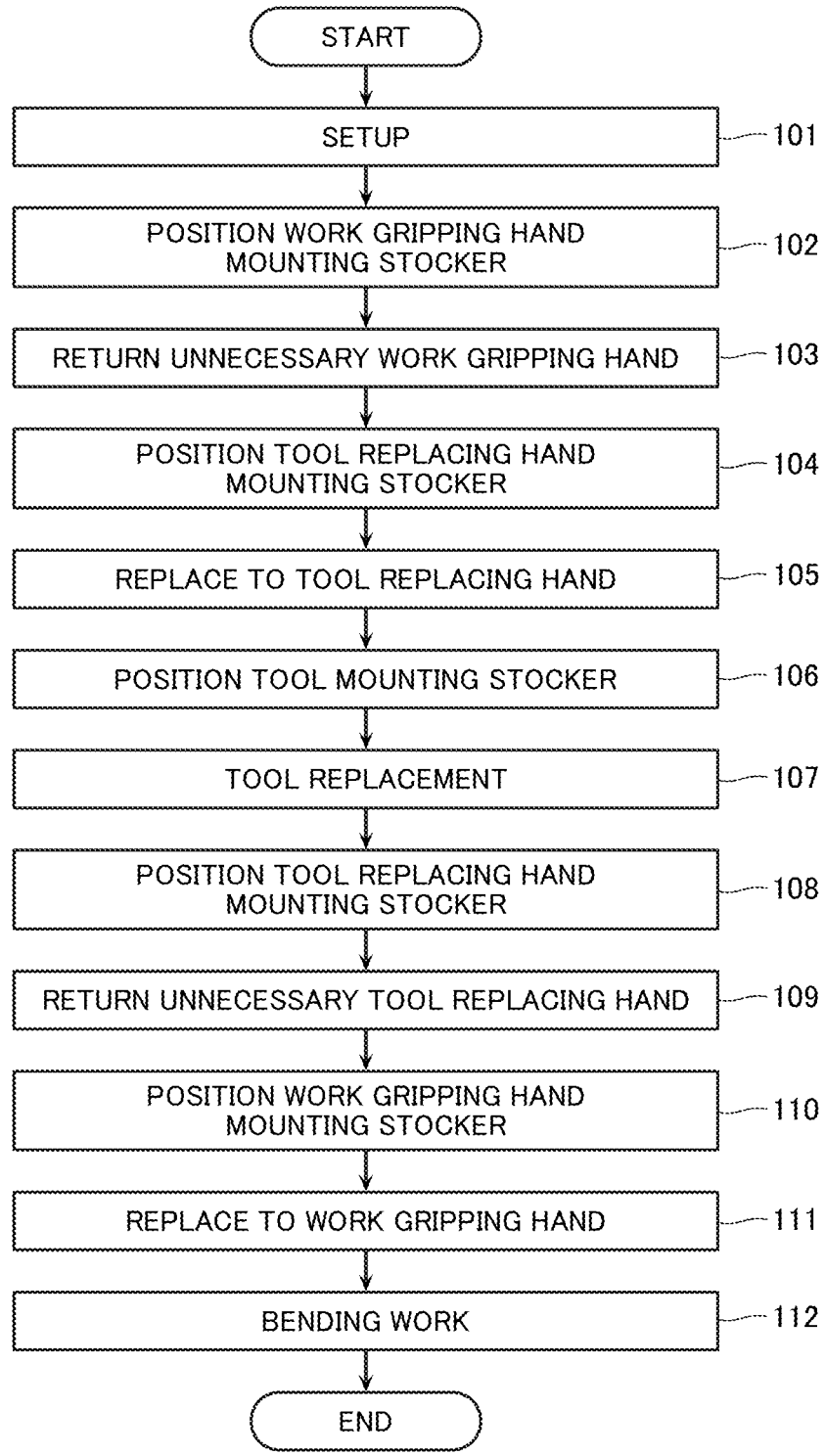
FIG. 17 is a flowchart illustrating an operation of a tool replacing method by the bending robot 4 of the present invention.

However, there is no safety fence 70 in the rear of the tool/hand storing device 3 but instead, the rear shutter 6 (FIGS. 9 to 10) is provided in the tool/hand storing device 3, and by lowering the rear shutter 6 to the lowest position as necessary, setup is made for the tool and the hand (Step 101 in FIG. 17).

This tool/hand storing device 3 has common points with the tool storing device 2 in FIG. 1 such that the tool/hand storing device 3 is installed lateral to the press brake 1 (FIG. 9), it has the tool mounting stockers S1 (corresponding to FIG. 3), S3 to S4, and S6 to S8 in which the punch P and the die 31 are mounted with the rear surfaces facing each other, the endless belts 8, 9 have one driving shaft (corresponding to FIG. 5), and the position of the path line PL of the appropriate stocker of the above-described tool mounting stockers S1, S3 to S4, and S6 to S8 can be freely positioned at the position of the path line PL of the tool holder 30, 31 on the press brake 1 side (FIGS. 6(A) and 6(B)), but it also has marked differences as described below.

The first difference is that the bending robot 4 is installed in front of the press brake 1 and the tool/hand storing device 3 movably in the longitudinal direction (X-axis direction).

That is, the bending robot 4 is, as illustrated in FIG. 9, movable in the longitudinal direction on rails 52 and 53 and has a male connector 54 at a distal end of an arm 50.

FIG. 11 is a view illustrating an attaching/detaching mechanism between the bending robot 4 and the work gripping hand 57 (FIG. 12) or the tool replacing hand 58 (FIG. 13) which will be described later.

The male connector 54 on the bending robot 4 side has a column 59, for example, and a plurality of balls 51 is provided along the column 59.

On the other hand, a female connector 55 on the hand 57 (58) side has a circular groove 60 into which the column 59 of the male connector 54 on the bending robot 4 side is inserted, and a plurality of holes 56 corresponding to the plurality of balls 51 of the male connector 54 is provided inside the circular groove 60.

With this configuration, after the column 59 on the male connector 54 side of the bending robot 4 is inserted into the circular groove 60 on the female connector 55 side of the hand 57 (58), the balls 51 around the column 59 protrude and are received by the holes 56 in the circular groove 60, whereby the bending robot 4 can attach the hand 57 (58) (so-called ball/lock method).

On the other hand, when the bending robot 4 is to detach the hand 57 (58), it is only necessary that the balls 51 received in the holes 56 (FIG. 11) are retracted and then, the column 59 is withdrawn from the circular groove 60.

Subsequently, the second difference is that the tool/hand storing device 3 (FIG. 9) has the above-described hand mounting stockers S2 and S5 for mounting the hand 57 (58) used by the bending robot 4.

That is, the hands used by the bending robot 4 are roughly divided into the work gripping hand 57 and the tool replacing hand 58.

The work gripping hand 57 is a hand when the bending robot 4 grips the work W to be subjected to bending work by the press brake 1 (FIG. 9), and is a vacuum pad (FIG. 12) or a jaw according to a form of the work W to be gripped.

Moreover, the tool replacing hand 58 is a hand used when the bending robot 4 performs tool replacement (FIGS. 14(A) to 16(B)) and as is well known, has a hook member (FIG. 13) for pressing a fall preventing member (disclosed in WO00/41824) of the above-described modular type tool and an engaging member required for movement of the tool.

Figure 12:
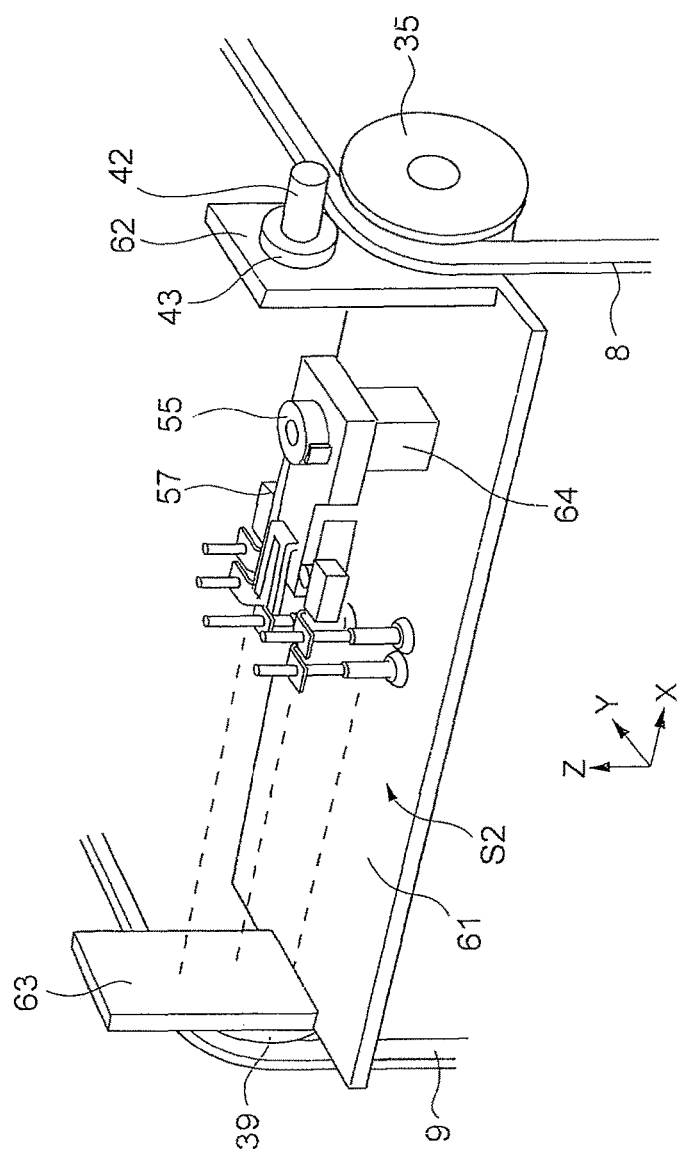
FIG. 12 is a view illustrating a work gripping hand mounting stocker S2 constituting the present invention.
Figure 13:
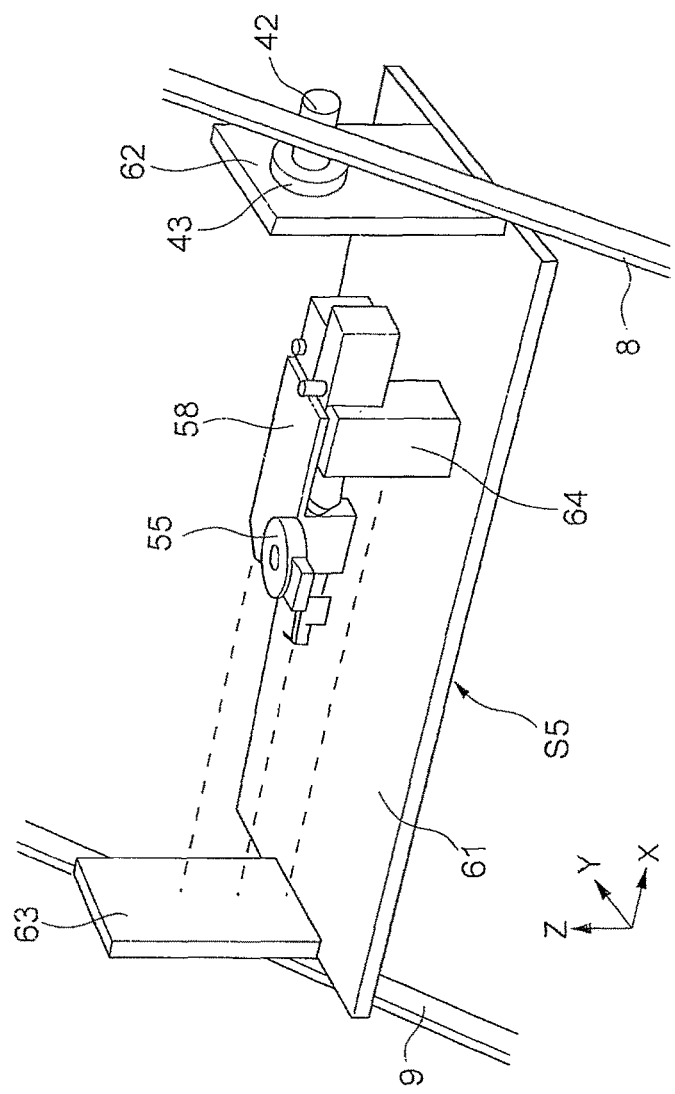
FIG. 13 is a view illustrating a tool replacing hand mounting stocker S5 constituting the present invention.

In the following embodiment, the work gripping hand 57 and the tool replacing hand 58 are mounted in the separate stockers, respectively, and FIG. 12 illustrates the work gripping hand mounting stocker S2, while FIG. 13 illustrates the tool replacing hand mounting stocker S5.

Figure 18:
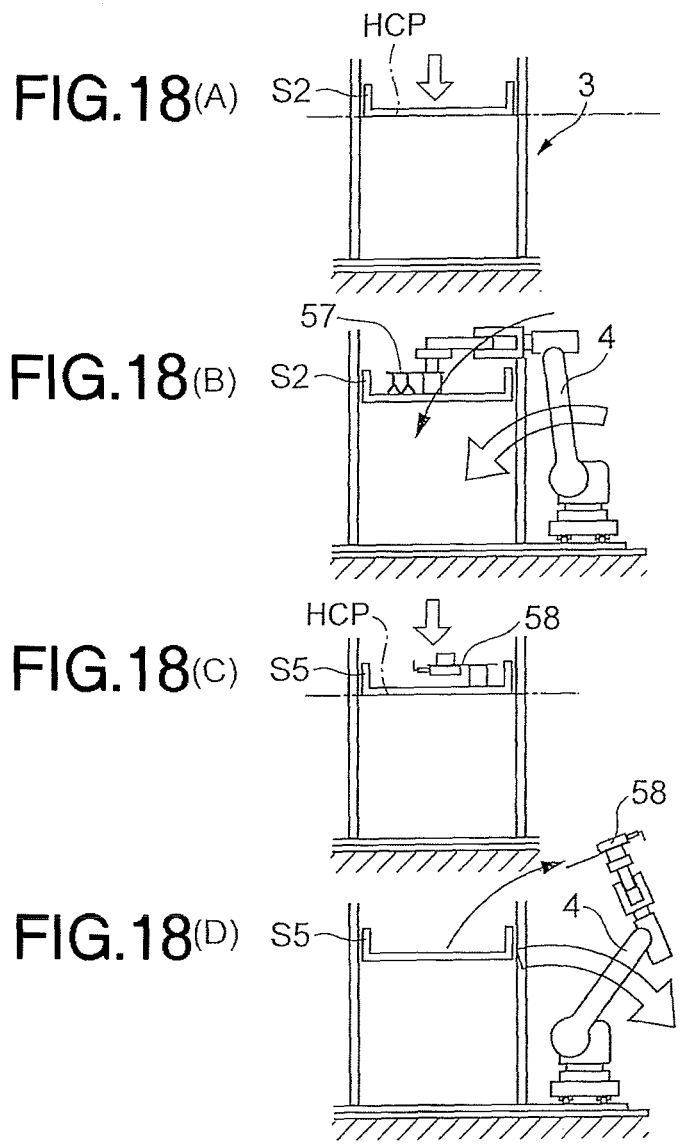

Alternatively, without preparing the separate stockers S2 and S5 as above, the work gripping hand 57 and the tool replacing hand 58 may be mixed in the stocker and in this case, it is only necessary that only the stocker in which the work gripping hand 57 and the tool replacing hand 58 are mixed is positioned at the hand replacement position HCP (only FIG. 18(A) is necessary and FIG. 18(C) is not needed, for example) both when the bending robot 4 replaces its hand to the tool replacing hand 58 (Step 105 in FIG. 17, for example) and when the bending robot 4 replaces its hand to the work gripping hand 57 (Step 111 in FIG. 17, for example), and hand replacement is performed further rapidly. In this case, too, a fixing unit similar to a fixing unit 64 (FIGS. 12 to 13) which will be described later is provided in the mixed stocker so that each of the hands mixed in the stocker does not fall.

The work gripping hand mounting stocker S2 (FIG. 12) is constituted by a mounting portion 61 mounting the work gripping hand 57 and extending in the longitudinal direction (X-axis direction) and support portions 62, 63 supported by the endless belts 8, 9 and extending in the vertical direction (Z-axis direction).

Figure 10:
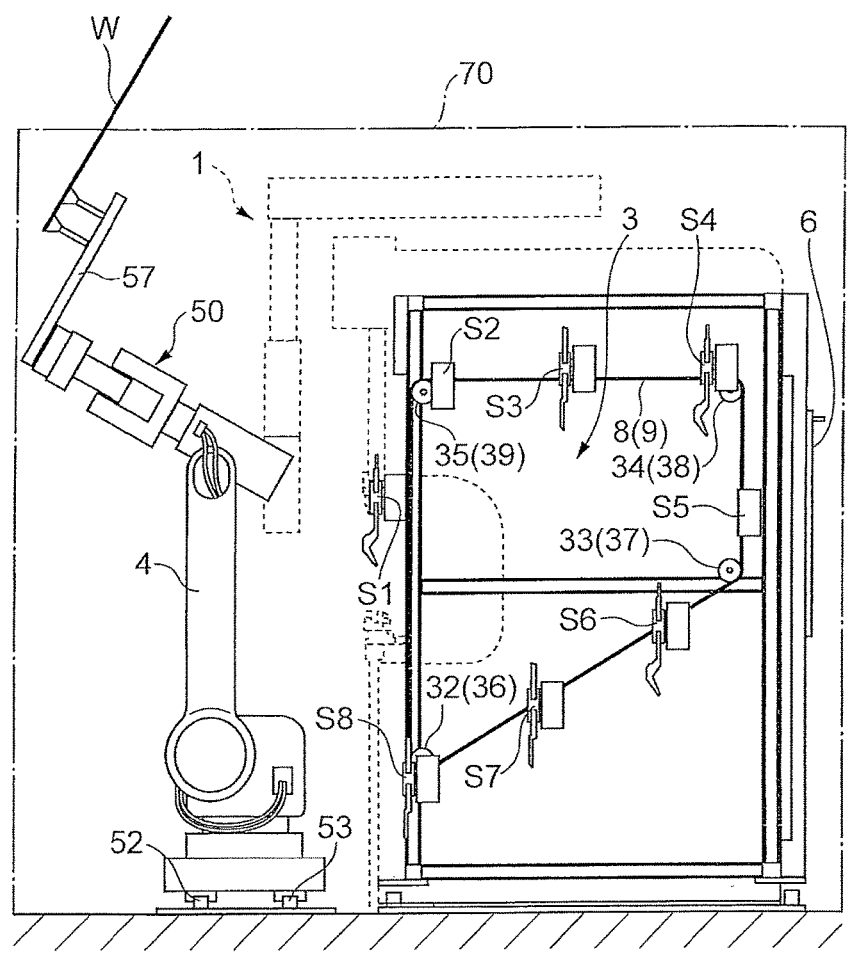
FIG. 10 illustrates a side surface of FIG. 9.

On the mounting portion 61, the fixing unit 64 (an electromagnet, for example) for firmly fixing the work gripping hand 57 is provided so that the work gripping hand 57 does not fall from the stocker S2 when the endless belts 8, 9 are circulated (FIG. 10).

Moreover, at replacement to the work gripping hand 57 (Step 111 in FIG. 17), the bending robot 4 returns the unnecessary tool replacing hand 58 to the stocker S5 (FIG. 13) and then, only by inserting the male connector 54 of its arm 50 (FIG. 11) into the female connector 55 of the work gripping hand 57 mounted in the stocker S2 (FIG. 12) and by locking the both, the electromagnet which is the fixing unit 64 is demagnetized at that point of time, and the bending robot 4 can rapidly take out the work gripping hand 57.

On the other hand, a relationship between the support portions 62, 63 and the endless belts 8, 9 is the same as the relationship between the orthogonal members 41B, 41C of the support base 41 to which the above-described tool mounting stockers S1 to S8 (FIG. 4) are fixed and the endless belts 8, 9.

That is, the support shaft 42 is rotatably supported by the support portions 62, 63 of the work gripping hand mounting stocker S2 (FIG. 12) through the bearing 43, and the support shaft 42 is fixed to the outer sides (upper sides in FIG. 12) of the endless belts 8, 9.

With this configuration, even if the endless belts 8, 9 circulate similarly through the pulleys 32 to 35 and 36 to 39 and the direction of the endless belts 8, 9 changes to the horizontal direction, the vertical direction or the diagonal direction, for example, the stocker S2 in which the work gripping hand 57 is mounted is configured to be directed downward at all times by the action of the force of gravity.

Therefore, by positioning the work gripping hand mounting stocker S2 at the hand replacement position HCP (Step 110 in FIG. 17), replacement to the work gripping hand 57 is made possible (Step 111 in FIG. 17).

On the other hand, the tool replacing hand mounting stocker S5 (FIG. 13) is constituted by the mounting portion 61 mounting the tool replacing hand 58 and extending similarly in the longitudinal direction (X-axis direction) and the support portions 62, 63 supported by the endless belts 8, 9 and extending similarly in the vertical direction (Z-axis direction).

On the mounting portion 61, the fixing unit 64 (an electromagnet, for example) for firmly fixing the tool replacing hand 58 is similarly provided so that the tool replacing hand 58 does not fall from the stocker S5 when the endless belts 8, 9 are circulated (FIG. 10).

Moreover, at replacement to the tool replacing hand 58 (Step 103 in FIG. 17), the bending robot 4 returns the unnecessary work gripping hand 57 to the stocker S2 (FIG. 12) and then, only by inserting the male connector 54 of its arm 50 (FIG. 11) into the female connector 55 of the tool replacing hand 58 mounted in the stocker S5 (FIG. 13) and by locking the both, the electromagnet which is the fixing unit 64 is demagnetized at that point of time, and the bending robot 4 can rapidly take out the tool replacing hand 58.

On the other hand, the relationship between the support portions 62, 63 and the endless belts 8, 9 is similarly the same as the relationship between the orthogonal members 41B, 41C of the support base 41 to which the above-described tool mounting stockers S1 to S8 (FIG. 4) are fixed and the endless belts 8, 9.

That is, the support shaft 42 is rotatably supported by the support portions 62, 63 of the tool replacing hand mounting stocker S5 (FIG. 13) through the bearing 43, and the support shaft 42 is fixed to the outer sides (lower sides in FIG. 13) of the endless belts 8, 9.

With this configuration, even if the endless belts 8, 9 circulate similarly through the pulleys 32 to 35 and 36 to 39 and the direction of the endless belts 8, 9 changes to the horizontal direction, the vertical direction or the diagonal direction, for example, the stocker S5 in which the tool replacing hand 58 is mounted is configured to be directed downward at all times by the action of the force of gravity.

Therefore, by positioning the tool replacing hand mounting stocker S5 at the hand replacement position HCP (Step 104 in FIG. 17), replacement to the tool replacing hand 58 is made possible (Step 105 in FIG. 17).

Moreover, the third difference is that, in the case of the tool/hand storing device 3 (FIG. 9), not the worker S (FIG. 1) but the bending robot 4 (FIGS. 9 and 10) performs tool replacement (Step 107 in FIG. 17) or bending work (Step 112 in FIG. 17) and thus, the endless belts 8, 9 circulate so that each of the stockers S1 to S8 (FIG. 10) does not protrude to the bending robot 4 side, and the fourth difference is that the tool/hand storing device 3 (FIG. 9) has, as described above, the hand mounting stockers S2, S5 in addition to the tool mounting stocker, and the appropriate stocker S2, S5 of the hand mounting stockers S2, S5 can be freely positioned at the hand replacement position HCP (Steps 102, 104 in FIG. 17, Steps 108, 110 in FIG. 17).

FIGS. 14(A) to 16(B) all illustrate how the tool is attached by the tool replacing hand 58 of the bending robot 4 in the tool holders 30, 31 on the press brake 1 side and their bases are tool layouts a (FIG. 21), b, c, and d which will be described later.

A tool replacing method by the robot using the tool/hand storing device 3 (FIG. 9) having the above configuration will be described below on the basis of FIG. 17.

(1) Setup Operation

First, at Step 101 in FIG. 17, setup is made.

That is, before the tool replacement or bending work is performed, the worker S (FIG. 1) lowers the rear shutter 6 of the tool/hand storing device 3 (FIGS. 9 and 11) to the lowest position, whereby the required tool and the hand or the tool or the hand are mounted in advance in the stockers S1 to S8 inside.

In other words, preparation is made in advance so that there is no missing tool or hand before full-scale performing.

(2) Operation until hand of bending robot 4 is replaced from work gripping hand 57 to tool replacing hand 58.

Subsequently, at Step 102 in FIG. 17, the work gripping hand mounting stocker S2 is positioned, at Step 103, the unnecessary work gripping hand 57 is returned, at Step 104, the tool replacing hand mounting stocker S5 is positioned, and at Step 105, replacement is made to the tool replacing hand 58.

That is, first, the work gripping hand mounting stocker S2 (FIG. 18(A)) is positioned at the hand replacement position HCP and then, the work gripping hand 57 held by the bending robot 4 (FIG. 18(B)) is returned to the stocker S2 positioned at the hand replacement position HCP.

The above-described hand replacement position HCP is a position where the hand is replaced between the bending robot 4 and the work gripping hand mounting stocker S2 or the tool replacing hand mounting stocker S5 and it is set in advance.

Subsequently, after the bending robot 4 returns the unnecessary work gripping hand 57 to the stocker S2 (FIG. 18(B)), the other tool replacing hand mounting stocker S5 (FIG. 18(C)) is positioned at the hand replacement position HCP, and the bending robot 4 itself takes out the tool replacing hand 58 which became necessary from the tool replacing hand mounting stocker S5 again (FIG. 18(D)).

As described above, the bending robot 4 replaces the hand owned by itself from the work gripping hand 57 to the tool replacing hand 58.

(3) Tool Replacement Operation

At Step 106 in FIG. 17, the tool mounting stocker is positioned, and at Step 107, tool replacement is performed.

That is, the position of the path line PL of the appropriate stocker of the tool mounting stockers S1 (FIGS. 9 and 10), S3 to S4, and S6 to S8 is positioned at the position of the path line PL of the tool holders 30, 31 on the press brake 1 side at this time (corresponding to FIGS. 6(A) and 6(B)) and then, the bending robot 4 having the tool replacing hand 58 (FIG. 18(D)) takes out the tools P, D at predetermined positions of the appropriate stocker (disclosed in WO00/41824 Gazette) and moves it to a predetermined position of the tool holders 30, 31 on the press brake 1 side, whereby tool replacement is performed (corresponding to FIGS. 7(A) and 7(B)).

(4) Operation until hand of bending robot 4 is replaced from tool replacing hand 58 to work gripping hand 57.

At Step 108 in FIG. 17, the tool replacing hand mounting stocker S5 is positioned, at Step 109, the unnecessary tool replacing hand 58 is returned, at Step 110, the work gripping hand mounting stocker S2 is positioned, and at Step 111, replacement is made to the work gripping hand 57.

That is, the operation in this case corresponds to FIGS. 18(A) to 18(D), and first, the tool replacing hand mounting stocker S5 is positioned at the hand replacement position HCP (corresponding to FIG. 18(A)), then, the tool replacing hand 58 held by the bending robot 4 is returned to the stocker S5 positioned at the hand replacement position HCP (corresponding to FIG. 18(B)).

Subsequently, after the bending robot 4 returns the unnecessary tool replacing hand 58 to the stocker S5 (corresponding to FIG. 18(B)), the other work gripping hand mounting stocker S2 is positioned at the hand replacement position HCP (corresponding to FIG. 18(C)), and the bending robot 4 itself takes out the work gripping hand 57 which became necessary from the work gripping hand mounting stocker S2 again (corresponding to FIG. 18(D)).

As described above, the bending robot 4 replaces the hand owned by itself from the tool replacing hand 58 to the work gripping hand 57.

(5) Bending Work Operation

At Step 112 in FIG. 17, bending work is performed.

That is, the bending robot 4 (FIGS. 9 to 10) grips the work W by the work gripping hand 57, moves to an appropriate working station at each bending order (process), supplies the gripped work W from between the punch P and the die D, makes it abut against the stoppers 10, 11 of the back gauge and positions it and then, the upper table 12 is lowered by the action of the hydraulic cylinders 14, 15, and the work W is subjected to bending work by collaboration of the punch P and the die D.

The present invention repeats the operations in FIG. 17 until the bending work is finished.

Figure 19:
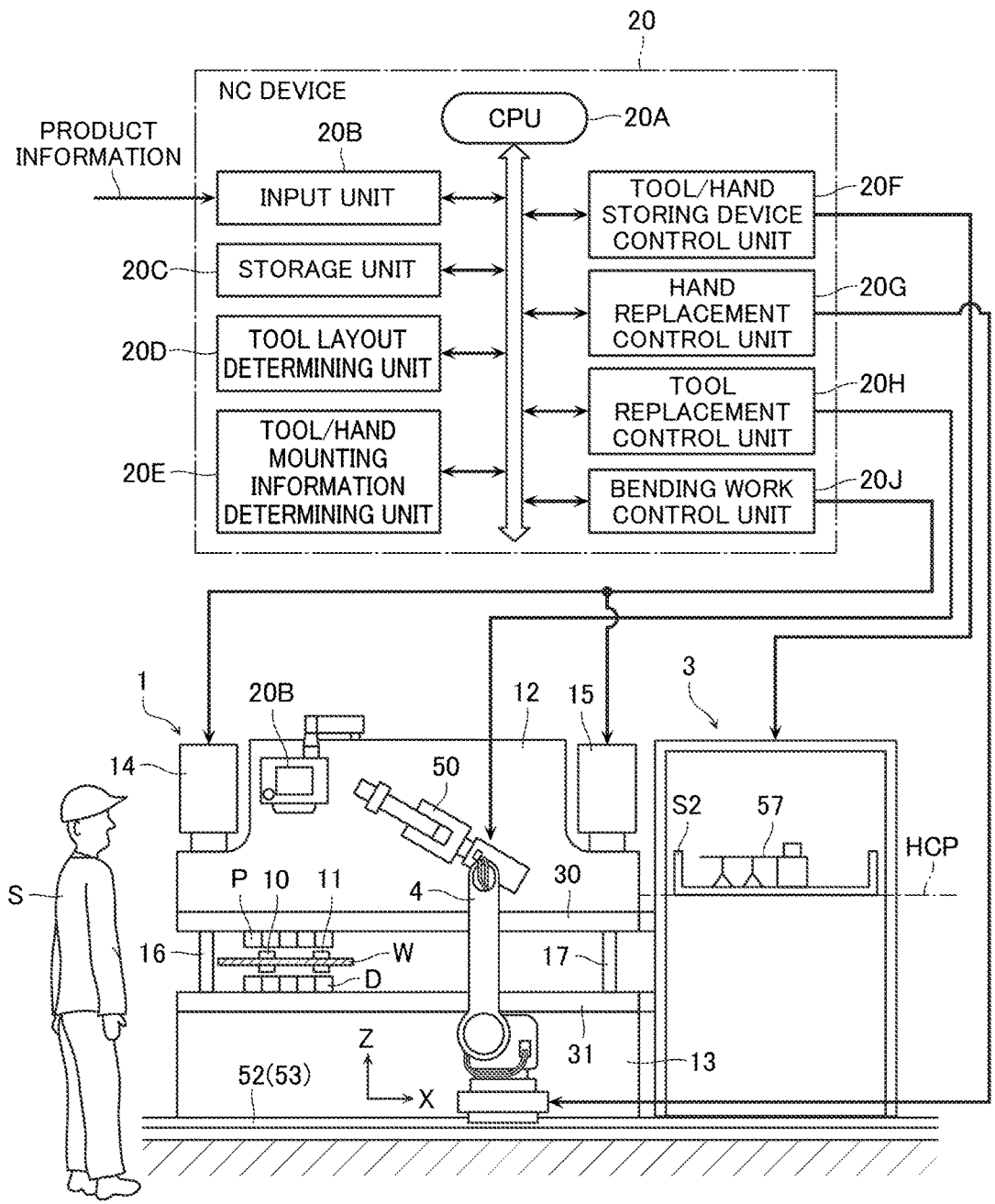
FIG. 19 is a view illustrating a control device directly used for execution of the tool replacing method by the bending robot 4 of the present invention.

FIG. 19 is a view illustrating a control device directly used for execution of the tool replacement method (FIG. 17 and FIGS. 18(A) to 18(D)) by the robot.

The above-described control device is constituted by an NC device 20, and the NC device 20 is constituted by a CPU 20A, an input unit 20B, a storage unit 20C, a tool layout determining unit 20D, a tool/hand mounting information determining unit 20E, a tool/hand storing device control unit 20F, a hand replacement control unit 20G, a tool replacement control unit 20H, and a bending work control unit 20J.

Figure 24:
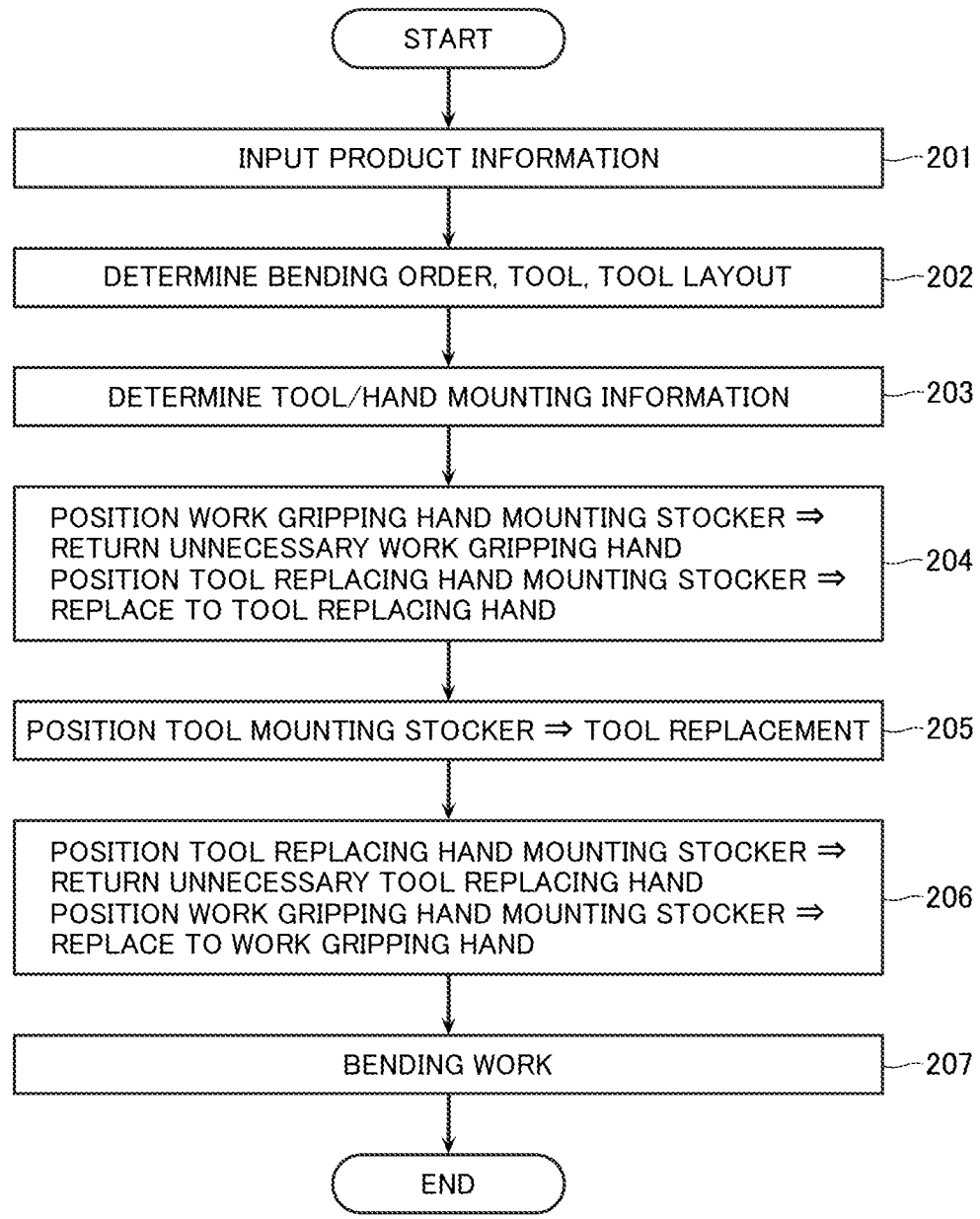
FIG. 24 is a flowchart for explaining an entire operation of the control device according to the present invention illustrated in FIG. 19.

The CPU 20A totally controls the entire device such as the tool layout determining unit 20D, the tool/hand mounting information determining unit 20E and the like illustrated in FIG. 19 in accordance with an operation procedure for executing the present invention (corresponding to FIG. 24, for example).

The input unit 20B constitutes a control panel mounted on the press brake 1 and as is well known, has a keyboard and the like, and product information and the like can be inputted automatically or manually by using this control panel 20B, for example, and an input result can be checked on a screen.

The above-described product information is CAD (Computer Aided Design) information, for example, and it includes information such as a plate thickness and a material of the work W (FIG. 20), lengths L1 to L4 of bending lines m1 to m4, a bending angle, and dimensions of flanges F1 to F4, and they are constituted as three-dimensional views and extended views.

The above-described storage unit 20C (FIG. 19) stores a program for executing the present invention and also stores bending orders, a tool for each bending order, a tool layout and the like (FIG. 21) determined by the tool layout determining unit 20D which will be described later and tool/hand mounting information (FIG. 22) determined by the tool/hand mounting information determining unit 20E as a database.

The tool layout determining unit 20D (FIG. 19) determines the bending orders (1), (2), (3) and (4) on the basis of the product information inputted through the input unit 20B and determines the tool for working the work W at each bending order and the tool layouts a, b, c and d (Step 101 to Step 102 in FIG. 24).

Figure 20:
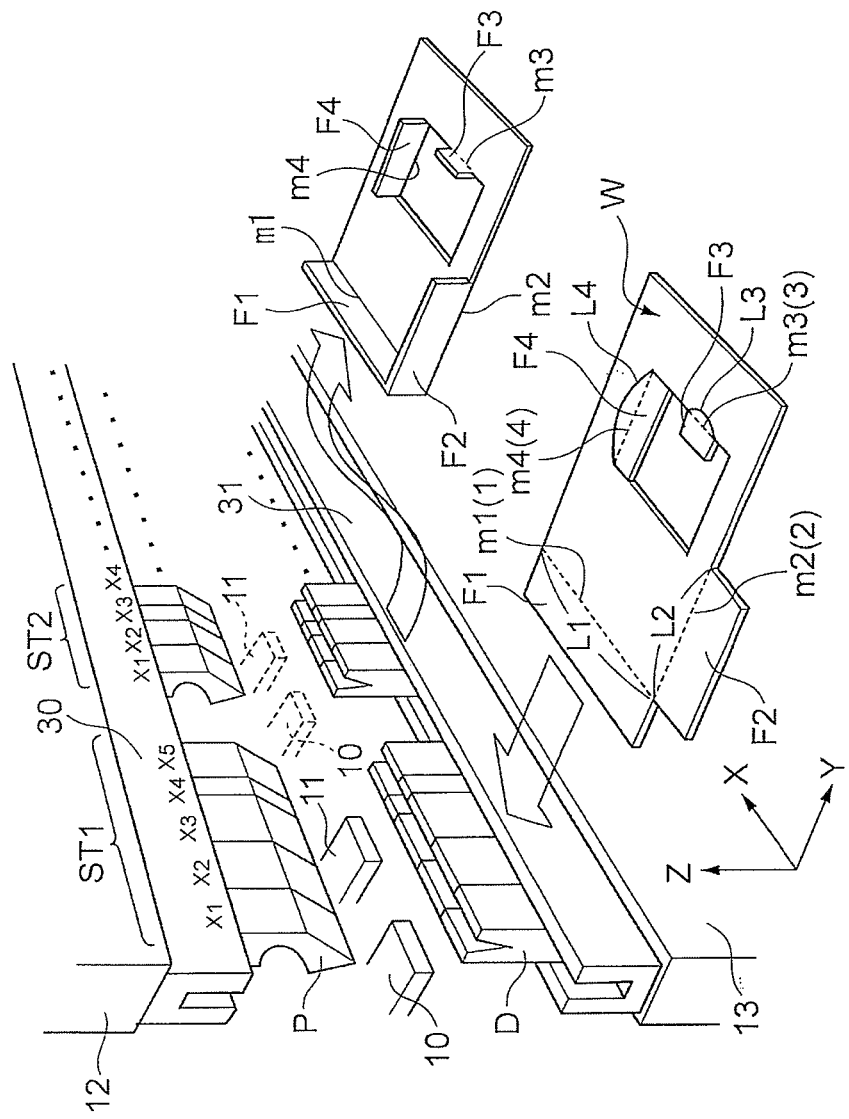
FIG. 20 is an explanatory view when a tool layout determining unit 20D (FIG. 19) constituting the present invention determines a bending order and the like on the basis of product information.

For example, as illustrated in FIG. 20, assuming that the bending lines m1, m2, m3 and m4 portions of the flat work W are bent in order of (1), (2), (3) and (4) and a product in which flanges F1, F2, F3 and F4 stand as illustrated is worked in the end, a result that the tool layout determining unit 20D (FIG. 19) determines the bending orders is illustrated in FIG. 21.

In FIG. 21, the tool layouts a, b, c and d made of the tool (marked by circles) arranged at each of positions X1, X2, . . . in each of working stations ST1, ST2 are illustrated in each bending order, and examples of the tool layout according to the present invention include those illustrated in FIGS. 14 to 16 described above.

Figure 14A:
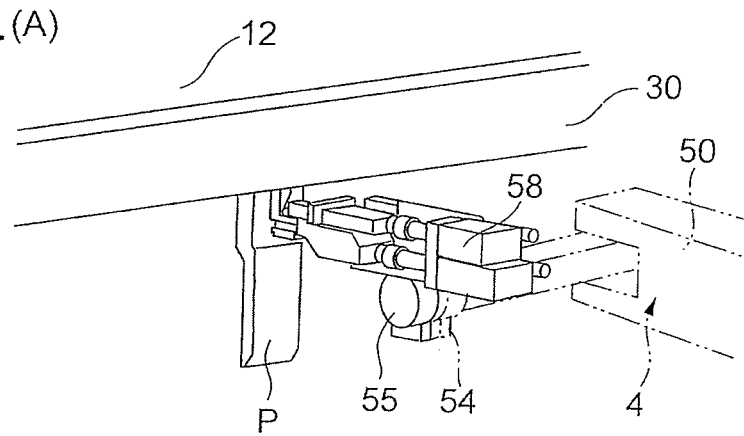
FIGS. 14(A) and 14(B) are views illustrating a mode of tool (punch P) replacement by the bending robot 4 according to the present invention.
Figure 14B:
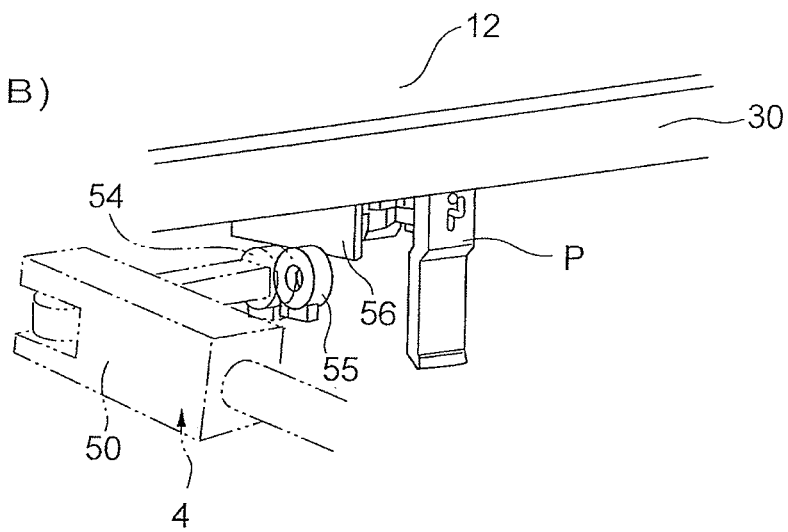

That is, FIG. 14(A) illustrates a case in which the punch P is attached on a front of the punch holder 30, and FIG. 14(B) illustrates a case in which the punch P is attached on a rear of the holder 30.

Figure 15A:
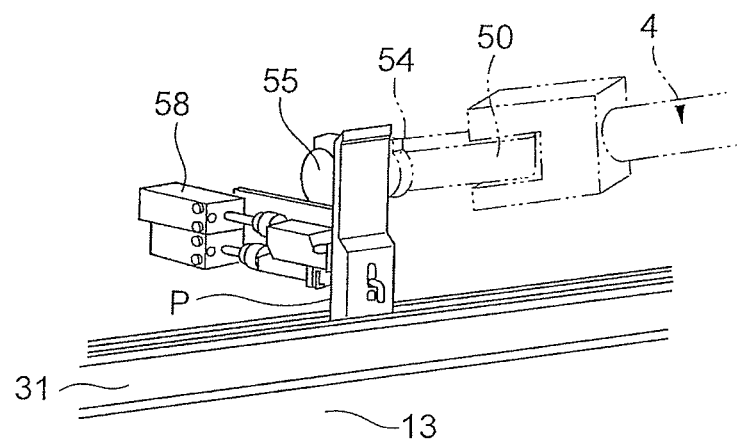
FIGS. 15(A) and 15(B) are views illustrating another mode of the tool (punch P) replacement by the bending robot 4 of the present invention.
Figure 15B:
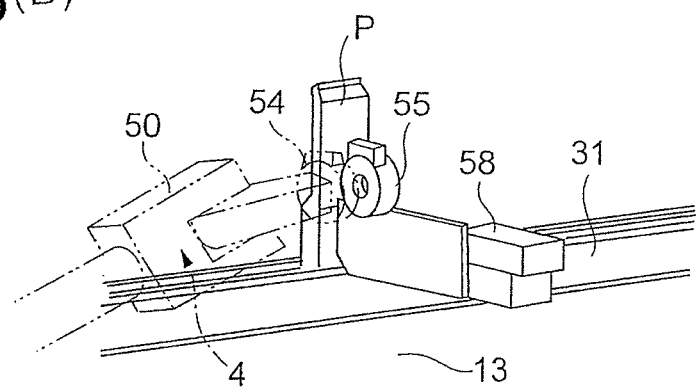

Moreover, FIG. 15(A) illustrates a case in which the punch P is attached on the rear of the die holder 31, and FIG. 15(B) illustrates a case in which the punch P is attached on the front of the holder 31.

Figure 16A:
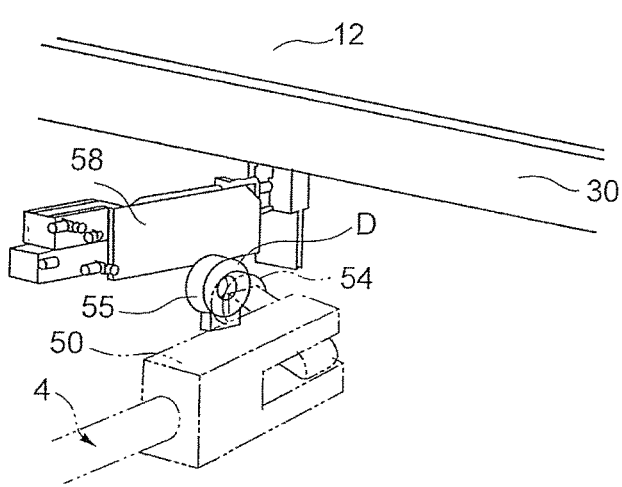
FIGS. 16(A) and 16(B) are views illustrating a mode of tool (die D) replacement by the bending robot 4 of the present invention.
Figure 16B:
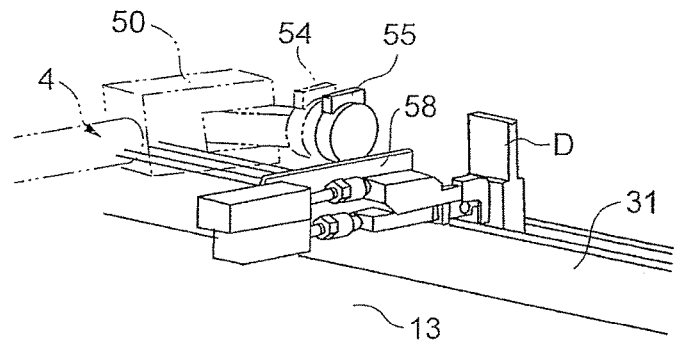

Further, FIG. 16(A) illustrates a case in which the die D is attached on a front of the punch holder 30, and FIG. 16(B) illustrates a case in which the die D is attached on the front of the die holder 31.

Figure 23:
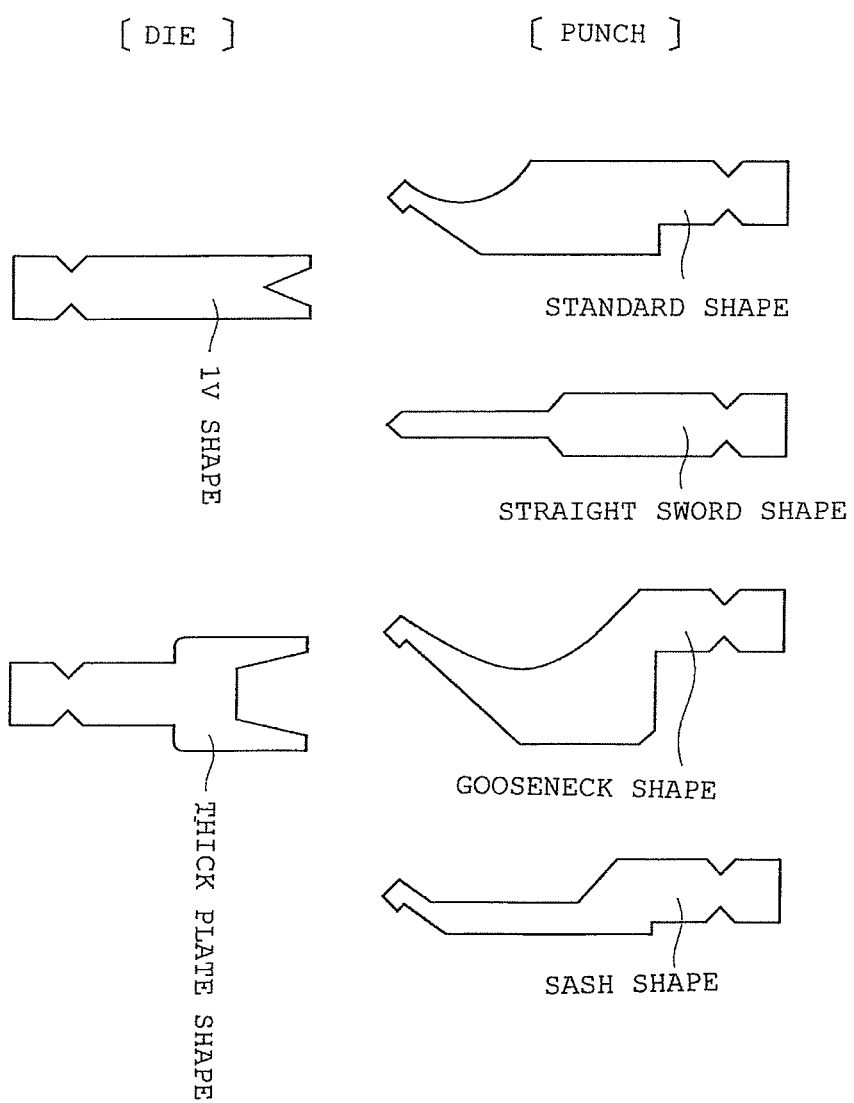
FIG. 23 is a view illustrating an example of a sectional shape of a tool used at each bending order according to the present invention.

In general, in the tool layout, not only at what position of the tool holders 30, 31 the tool with what sectional shape (FIG. 23) and what length (X-axis direction (mm)) is to be arranged but also interference between the work W and the tool and interference between the work W and the upper table 12, the lower table 13 need to be considered.

Therefore, the punch P may be attached to the rear of the punch holder 30 as illustrated in FIG. 14(B), the punch P may be attached to the rear of the die holder 31 as illustrated in FIG. 15(A), the punch P may be attached to the front of the die holder 31 as illustrated in FIG. 15(B), or the die D may be attached to the front of the punch holder 30 as illustrated in FIG. 16(A).

On the other hand, the above-described tool/hand mounting information determining unit 20E (FIG. 19) determines the tool/hand mounting information expressing at what position in which of the stockers S1, S3 to S4, and S6 to S8 of the tool/hand storing device 3 (FIG. 9, FIG. 19) the tools P, D constituting the tool layouts a (FIG. 21), b, c and d determined by the tool layout determining unit 20D are mounted or at what position in which of the stockers S2 and S5 the hand that the bending robot 4 should be provided with is mounted when the work W is to be gripped and when the tools P, D are to be replaced.

In this case, the tool/hand mounting information determining unit 20E (FIG. 19) is constituted by the input unit 20B and the storage unit 20C, for example, and the tool/hand mounting information is inputted from the input unit 20B by the worker S and is stored in the storage unit 20C as the database.

Alternatively, the tool/hand mounting information determining unit 20E (FIG. 19) may include a plurality of already known electrostatic capacitance type position detection sensor or the like in calipers or the like, for example, arranged in a right-and-left direction as a tool/hand position detecting unit in the stocker and automatically store the above-described tool/hand mounting information in the storage unit 20C as the database.

Figure 22:
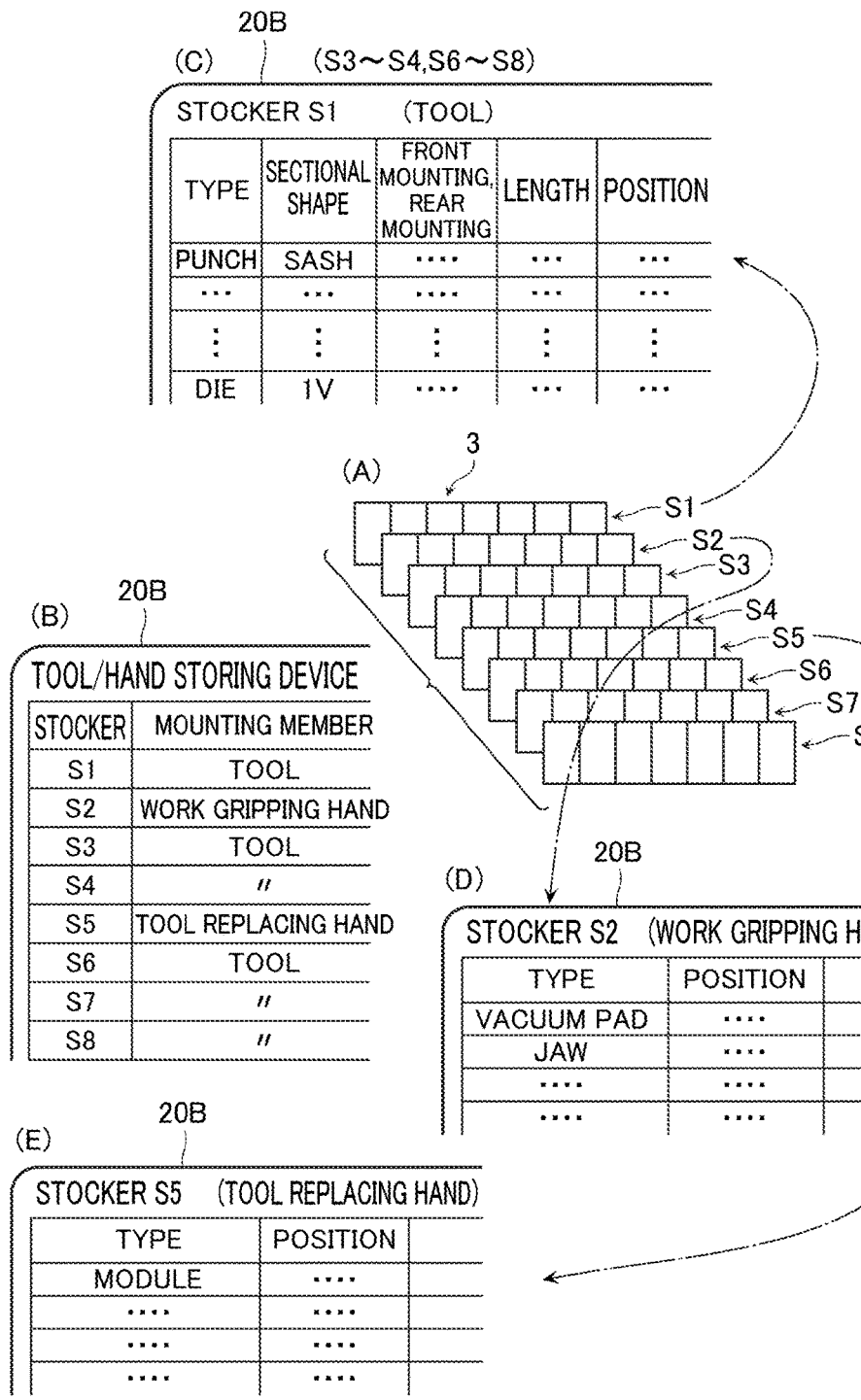
FIG. 22 is an explanatory view when a tool/hand mounting information determining unit 20E (FIG. 19) constituting the present invention determines tool/hand mounting information.

That is, a specific example of the tool/hand mounting information is illustrated in FIG. 22, for example.

First, FIG. 22(A) illustrates the stockers S1 to S8 in the tool/hand storing device 3 (FIGS. 9 and 19) and the stockers S1, S3 to S4, and S6 to S8 among them are the tool mounting stockers, and the stockers S2 and S5 are the hand mounting stockers (the stocker S2 among them is the work gripping hand mounting stocker and the stocker S5 is the tool replacing hand mounting stocker).

Then, FIG. 22(B) illustrates entire information of the tool/hand storing device 3 illustrating what member is mounted in which stocker of the above-described stockers S1 to S8 (FIG. 22(A)).

For example, the tool made of the punch P and the die D (with rear surfaces facing each other) is mounted in the stockers S1 (FIGS. 9 and 10), S3 to S4, and S6 to S8, and the work gripping hand 57 in the stocker S2 and the tool replacing hand 58 in the stocker S5, respectively.

Moreover, FIG. 22(C) illustrates detailed information of the stocker S1 in which the tool is mounted.

For example, the tool mounting information of the stocker S1 is information on whether the sectional shape is a sash shape (FIG. 23) and is attached to the front or to the rear and what the length (X-axis direction (mm)) and the position (coordinate in the X-axis direction in the stocker S1) are for the punch and on whether the sectional shape is a 1V shape (FIG. 23) and is attached to the front or to the rear and what the length (X-axis direction (mm)) and the position (coordinate in the X-axis direction in the stocker S1) are for the die.

Such detailed tool mounting information also includes information automatically stored in the storage unit 20C (FIG. 19) by a tool identifying medium reading unit provided separately from a tool identifying medium such as a barcode, an IC chip and the like provided in the tool, similarly to the above-described tool/hand position detecting unit (see the latter half of the above-described paragraph No. [0124]).

The source of such information is the tool layouts a (FIG. 21), b, c and d determined by the tool layout determining unit 20D (FIG. 19), and the information on whether it is attached to the front or to the rear, for example, expresses a state of the tool mounted in this stocker S1.

In the above-described FIG. 22(C), if the punch is attached to the front, it expresses that the punch is attached to the front of the stocker S1.

Therefore, when the punch P is to be attached to the front of the punch holder 30 on the press brake 1 side (FIG. 14(A), for example), it is only necessary that the bending robot 4 takes out the punch mounted on the front of the stocker S1 of the tool/hand storing device 3 as it is.

However, as the information of the tool mounted in the stocker S1, whether it is attached to the front or to the rear is not necessarily required.

For example, at a stage of being mounted in the stocker S1, even if the punches are all mounted on the front, at a point of time when the bending robot 4 attaches the punch P to the punch holder 30 (FIG. 14) on the press brake 1 side, it makes determination by referring to the tool layouts a, b, c and d (FIG. 21) and can change to attachment to the rear by reversing the punch P inside out immediately before as illustrated in FIG. 14(B).

The above-described FIG. 22(C) illustrates detailed information of the stocker S1 in which the tool is mounted, but the same applies to the other stockers S3 to S4, and S6 to S8.

The sectional shape (FIG. 22(C)) as the tool/hand mounting information in FIG. 22 also includes a standard shape, a straight sword shape, a gooseneck shape and the like for the punch (FIG. 23) and a thick plate shape and the like for the die in addition to those illustrated, and they are also based on the tool layouts a (FIG. 21), b, c and d determined by the above-described tool layout determining unit 20D (FIG. 19).

FIG. 22(D) illustrates detailed information of the stocker S2 in which the work gripping hand 57 is mounted.

For example, the work gripping hand mounting information of the stocker S2 is information on whether the type is a vacuum pad or a jaw and the like and what the position is (coordinate in the X-axis direction in the stocker S2).

In this case, what type of the work gripping hand is to be attached to the bending robot 4 is based on the form of the work W which is to be bent and is determined from the viewpoint on whether the work W can be gripped easily or not.

FIG. 22(E) illustrates detailed information of the stocker S5 in which the tool replacing hand 58 is mounted.

For example, the tool replacing hand mounting information of the stocker S5 is information on whether the type is a module or not and what the position is (coordinate in the X-axis direction in the stocker S2).

In this case, what type of the tool replacing hand is to be attached to the bending robot 4 is based on the form of the tool which is to be replaced and is determined from the viewpoint on whether the tool is a module (disclosed in WO00/41824 Gazette) or not.

The tool/hand mounting information in the above-described FIG. 22 has been found by the worker S in the setup process before the tool replacement or bending work and therefore, by inputting it from the screen of the input unit 20B (FIG. 19) in advance, it is stored in the storage unit 20C as the database.

The tool/hand mounting information (FIG. 22) stored in the above-described storage unit 20C is referred to when the tool/hand storing device control unit 20F (FIG. 19), the hand replacement control unit 20G, and the tool replacement control unit 20H which will be described later are driven.

The above-described tool/hand storing device control unit 20F (FIG. 19) determines the hands 57, 58 and the tool the bending robot 4 should need on the basis of the above determined tool layouts a, b, c and d and the tool/hand mounting information, positions the appropriate stocker of the hand mounting stockers S2, S5 at the hand replacement position HCP or positions the position of the path line PL of the appropriate stocker of the tool mounting stockers S1, S3 to S4, and S6 to S8 at the position of the path line PL of the tool holder 30, 31 on the press brake 1 side.

Moreover, the hand replacement control unit 20G (FIG. 19) performs hand replacement between the appropriate stocker of the hand mounting stockers S2, S5 and the bending robot 4 through the bending robot 4.

Furthermore, the tool replacement control unit 20H (FIG. 19) performs tool replacement between the appropriate stocker of the tool mounting stockers S1, S3 to S4, and S6 to S8 and the tool holders 30, 31 on the press brake 1 side through the bending robot 4.

Subsequently, the bending work control unit 20J (FIG. 19) operates the ram driving sources 14, 15 after the tool replacement by the bending robot 4 using the tool replacement control unit 20H and has the work W gripped by the bending robot 4 with the work gripping hand 58 and supplied to the press brake 1 and bent by the punch P and the die D.

These tool/hand storing device control unit 20F, the hand replacement control unit 20G, the tool replacement control unit 20H, and the bending work control unit 20J play roles of operation entities at Step 204 to Step 207 in FIG. 24 as will be described later.

An operation of the present invention having the above-described configuration will be described below on the basis of FIG. 24.

(1) Operation until tool/hand mounting information is Determined.

At Step 201 in FIG. 24, the product information is inputted, at Step 202, the bending order, the tool, and the tool layout are determined, and at Step 203, the tool/hand mounting information is determined.

That is, when the CPU 20A (FIG. 19) detects that the product information is inputted through the input unit 20B, it determines the bending order, the tool, and the tool layout through the tool layout determining unit 20D and moreover, when it detects that the tool/hand mounting information (FIG. 22) is inputted through the input unit 20B, it determines the tool/hand mounting information through the tool/hand mounting information determining unit 20E and stores the tool layout and the tool/hand mounting information in the storage unit 200 (FIG. 19) as the database.

(2) Operation at Step 204 to Step 207

Steps 204, 205, 206 and 207 in FIG. 24 are totally the same as Step 102 to Step 105, Step 106 to Step 107, Step 108 to Step 111, and Step 112 in FIG. 17, respectively, and a difference is that in the operation in the above-described FIG. 24, the operation entity such as the tool layout determining unit 20D, the tool/hand mounting information determining unit 20E, the tool/hand storing device control unit 20F and the like constituting the control device is clearer.

(3) First, the operation at Step 204 in FIG. 24 is as follows

That is, the work gripping hand mounting stocker S2 is positioned (corresponding to Step 102 in FIG. 17), the unnecessary work gripping hand 57 is returned (corresponding to Step 103 in the same figure), the tool replacing hand mounting stocker S5 is positioned (corresponding to Step 104 in the same figure), and replacement is made to the tool replacing hand 58 (corresponding to Step 105 in the same figure).

Specifically, the CPU 20A (FIG. 19) determines that the unnecessary work gripping hand 57 should be returned by the bending robot 4 on the basis of the determined tool layouts a, b, c and d (FIG. 21) as described above and the tool/hand mounting information (FIG. 22) and first, by driving/controlling the tool/hand storing device control unit 20F (FIG. 19), first, the work gripping hand mounting stocker S2 (corresponding to FIG. 18(A)) is positioned at the hand replacement position HCP.

Subsequently, the CPU 20A (FIG. 19) drives/controls the hand replacement control unit 20G and returns the work gripping hand 57 held by the bending robot 4 (corresponding to FIG. 18(B)) to the stocker S2 positioned at the hand replacement position HCP.

Subsequently, the CPU 20A (FIG. 19) further drives/controls the tool/hand storing device control unit 20F, positions the other tool replacing hand mounting stocker S5 (corresponding to FIG. 18(C)) at the hand replacement position HCP, drives/controls the hand replacement control unit 20G again and has the bending robot 4 take out the required tool replacing hand 58 from the tool replacing hand mounting stocker S5 (corresponding to FIG. 18(D)).

(4) Subsequently, the operation at Step 205 in FIG. 24 is as follows. That is, the tool mounting stocker is positioned (corresponding to Step 106 in FIG. 17), and tool replacement is performed (corresponding to Step 107 in the same figure).

Specifically, the CPU 20A (FIG. 19) drives/controls the tool/hand storing device control unit 20F and positions the position of the path line PL of the appropriate stocker of the tool mounting stockers S1 (corresponding to FIGS. 9 and 10), S3 to S4, and S6 to S8 at the position of the path line PL of the tool holder 30, 31 on the press brake 1 side (corresponding to FIGS. 6(A) and 6(B)).

After that, the CPU 20A (FIG. 19) drives/controls the tool replacement control unit 20H, has the bending robot having the above-described tool replacing hand 58 (corresponding to FIG. 18(D)) take out the tools P, D at predetermined positions of the appropriate stocker (disclosed in WO00/41824 Gazette) and has tool replacement performed by moving the tools P, D to the predetermined positions of the tool holder 30, 31 on the press brake 1 side (corresponding to FIG. 7).

(5) Subsequently, the operation at Step 206 in FIG. 24 is as follows. That is, the tool replacing hand mounting stocker S5 is positioned (corresponding to Step 108 in FIG. 17), the unnecessary tool replacing hand 58 is returned (corresponding to Step 109 in the same figure), the work gripping hand mounting stocker S2 is positioned (corresponding to Step 110 in the same figure), and replacement is made to the work gripping hand 57 (corresponding to step 111 in the same figure).

Specifically, the CPU 20A (FIG. 19) first drives/controls the tool/hand storing device control unit 20F, positions the tool replacing hand mounting stocker S5 at the hand replacement position HCP (corresponding to FIG. 18(A)), and then, drives/controls the hand replacement control unit 20G and returns the tool replacing hand 58 held by the bending robot 4 to the stocker S6 positioned at the hand replacement position HCP (corresponding to FIG. 18(B)).

Subsequently, the CPU 20A (FIG. 19) drives/controls the tool/hand storing device control unit 20F again, positions the other work gripping hand mounting stocker S2 at the hand replacement position HCP (corresponding to FIG. 18(C)), drives/controls the hand replacement control unit 20G again and has the bending robot 4 take out the required work gripping hand from the work gripping hand mounting stocker S2 (corresponding to FIG. 18(D)).

(6) Finally, the operation at Step 207 in FIG. 24 is as follows.

That is, bending work is performed (corresponding to Step 112 in FIG. 17).

Specifically, the CPU 20A (FIG. 19) drives/controls the bending work control unit 20J, the bending robot 4 moves to the appropriate working station for each bending order (process) while gripping the work W by the work gripping hand 57 and supplies the gripped work W and has it abut against the stoppers 10, 11 of the back gauge between the punch P and the die D and positions it and then, the upper table 12 is lowered by the action of the hydraulic cylinders 14, 15 and the work W is bent by collaboration between the punch P and the die D.

INDUSTRIAL APPLICABILITY

The present invention is used to simplify a configuration of the entire tool storing device and save an installation space by storing the punch and the die together, to reduce time for tool replacement, and to enable rapid and easy tool replacement by the bending robot by storing not only the tool made of the punch and the die but also the hand for the robot together, and it is applied not only to a lowering press brake (FIGS. 1, 9, 19) but also to a rising press brake in which the work is bent by the punch and the die by rising of the lower table which is a ram and is extremely useful.

REFERENCE SIGNS LIST 1 press brake
2, 3 tool storing device
4 bending robot
5, 6 shutter
7 foot pedal
8, 9 endless belt
10, 11 stopper
12 upper table
13 lower table
14, 15 hydraulic cylinder
16, 17 side plate
20 NC device 20
20A CPU 20A
20B input unit
20C storage unit
20D tool layout determining unit
20E tool/hand mounting information determining unit
20F tool/hand storing device control unit
20G hand replacement control unit
20H tool replacement control unit
20J bending work control unit
30, 31 tool holder
32, 33, 34, 35 one pulley
36, 37, 38, 39 the other pulley
40 connecting shaft
41 support base
42 support shaft
43 bearing
50 arm of bending robot 4
51 ball
52, 53 rail
54 male connector
55 female connector
56 hole
57 work gripping hand
58 tool replacing hand
59 column 60 circular groove
61 mounting portion of hand mounting stockers S2, S5
62, 63 support portion of hand mounting stocker S2, S5
64 fixing unit of hand mounting stockers S2, S5
70 safety fence
D die
P punch
W work
S1 to S8 stocker

The invention claimed is:

1. A tool storing device for mounting at least one punch and at least one die of a press brake, the tool storing device, comprising:
 a first endless chain and a second endless chain, wherein the first endless chain and the second endless chain are configured to circulate in tandem;
 a plurality of tool mounting stockers that are disposed across the first endless chain and the second endless chain, and that are configured to circulate along with the first endless chain and the second endless chain; wherein each of the plurality of tool mounting stockers includes:
  a respective upper slot that opens upward in a vertical direction; and
  a respective lower slot that opens downward in the vertical direction and that is disposed opposite the upper slot in the vertical direction, wherein within each of the plurality of tool mounting stockers, the upper slot thereof is configured to engage a rear surface of the at least one die and the lower slot thereof is configured to engage a rear surface of the at least one punch such that the respective rear surfaces of the at least one die and the at least one punch are disposed proximal one another in the vertical direction, and the respective rear surfaces of the at least one die and the at least one punch are each disposed opposite respective work portions of the at least one die and the at least one punch in the vertical direction, the work portions of the at least one die and the at least one punch being configured to subject a work piece to bending.

2. The tool storing device according to claim 1, wherein the at least one die is a plurality of dies,
the at least one punch is a plurality of punches, and
within each of the plurality of tool mounting stockers, the upper slot thereof is configured to engage rear surfaces of the plurality of dies and the lower slot thereof is configured to engage rear surfaces of the plurality of punches such that the respective rear surfaces of the plurality of dies are disposed proximate the respective rear surfaces of the plurality of punches in the vertical direction.

* * * * *